US009159186B2

(12) United States Patent
Walker et al.

(10) Patent No.: US 9,159,186 B2
(45) **Date of Patent: *Oct. 13, 2015**

(54) METHOD AND APPARATUS FOR PROVIDING A COMPLIMENTARY SERVICE TO A PLAYER

(71) Applicant: IGT, Las Vegas, NV (US)

(72) Inventors: Jay S. Walker, Ridgefield, CT (US); James A. Jorasch, New York, NY (US); Russell P. Sammon, San Francisco, CA (US); Thomas M. Sparico, Hoboken, NJ (US)

(73) Assignee: IGT, Las Vegas, NV (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/095,249

(22) Filed: Dec. 3, 2013

(65) Prior Publication Data

US 2014/0094288 A1 Apr. 3, 2014

Related U.S. Application Data

(63) Continuation of application No. 13/722,640, filed on Dec. 20, 2012, now Pat. No. 8,608,552, which is a continuation of application No. 13/313,818, filed on Dec. 7, 2011, now Pat. No. 8,360,865, which is a (Continued)

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/32* (2013.01); *G07F 17/3225* (2013.01); *G07F 17/3244* (2013.01); *G07F 17/3255* (2013.01)

(58) Field of Classification Search

USPC ........................................................ 463/25, 42

See application file for complete search history.

(56) References Cited

U.S. PATENT DOCUMENTS

| | | | |
|---|---|---|---|
| 4,698,840 | A | 10/1987 | Dively et al. |
| 4,760,527 | A | 7/1988 | Sidley |
| 4,837,422 | A | 6/1989 | Dethloff et al. |

(Continued)

FOREIGN PATENT DOCUMENTS

| | | |
|---|---|---|
| DE | 4422369 | 9/1995 |
| GB | 2 176 639 | 12/1986 |

(Continued)

OTHER PUBLICATIONS

"Casino Bonus Free Money," (http://www.casion-bonus-free-money.com/), download date: Sep. 4, 2003 (2 pages).

(Continued)

*Primary Examiner* — Kevin Y Kim

(74) *Attorney, Agent, or Firm* — Neal, Gerber & Eisenberg LLP

(57) ABSTRACT

Systems and methods are provided for providing a service to a player using a player device. A indication of a player identifier which corresponds to a player of a gaming device is received. A player device is provided to the player. A service to provide the player is determined based on a gaming activity of the player, and the service is then provided to the player using the player device.

29 Claims, 11 Drawing Sheets

600

| | PLAYER IDENTIFIER 610 | CONDITION 620 | CONDITION TRUE? 630 | SERVICE PROVIDED 640 | PLAYER DEVICE 650 |
|---|---|---|---|---|---|
| 655 | PLAYER-1-02834555 | RATE_OF_PLAY >= 15 COINS/MIN | YES | 1 MINUTE PHONE SERVICE FOR EACH MINUTE OF GAME PLAY | DEVICE-1-24579282 |
| 660 | PLAYER-2-02834555 | RATE_OF_PLAY >= 15 COINS/MIN | NO | NONE | DEVICE-2-24579282 |
| 665 | PLAYER-3-02834555 | CREDIT_BALANCE >= 50 COINS | YES | 100 KB INTERNET ACCESS PER COIN BET | DEVICE-3-24579282 |
| 670 | PLAYER-4-02834555 | 3D_GRAPHICS_MODE_ENABLED | YES | 1.2 MINUTES OF PHONE SERVICE PER COIN WON | DEVICE-4-24579282 |
| 675 | PLAYER-5-02834555 | THEORETICAL_WIN_PER_MINUTE > COST_OF_SERVICE_PER MINUTE | YES | FREE VIEWING OF PREMIUM MOVIE CHANNEL | DEVICE-5-24579282 |

Related U.S. Application Data continuation of application No. 10/655,154, filed on Sep. 4, 2003, now Pat. No. 8,087,996, and a continuation-in-part of application No. 10/322,107, filed on Dec. 18, 2002, now Pat. No. 7,101,282, which is a continuation of application No. 09/641,903, filed on Aug. 18, 2000, now Pat. No. 6,530,835, which is a continuation of application No. 08/821,437, filed on Mar. 21, 1997, now Pat. No. 6,139,431.

(60) Provisional application No. 60/408,473, filed on Sep. 4, 2002.

(56) References Cited

U.S. PATENT DOCUMENTS

| | | | |
|---|---|---|---|
| 5,018,021 | A | 5/1991 | Slater |
| 5,179,517 | A | 1/1993 | Sarbin et al. |
| 5,259,613 | A | 11/1993 | Marnell, II |
| 5,276,312 | A | 1/1994 | Mccarthy |
| 5,283,734 | A | 2/1994 | Von Kohorn |
| 5,321,241 | A | 6/1994 | Craine |
| 5,324,035 | A | 6/1994 | Morris et al. |
| 5,356,140 | A | 10/1994 | Dabrowski et al. |
| 5,359,182 | A | 10/1994 | Schilling |
| 5,429,361 | A | 7/1995 | Raven et al. |
| 5,456,648 | A | 10/1995 | Edinburg et al. |
| 5,655,961 | A | 8/1997 | Acres et al. |
| 5,714,741 | A | 2/1998 | Pieterse et al. |
| 5,755,621 | A | 5/1998 | Marks et al. |
| 5,768,382 | A | 6/1998 | Schneier et al. |
| 5,770,533 | A | 6/1998 | Franchi |
| 5,909,486 | A | 6/1999 | Walker et al. |
| 5,971,271 | A | 10/1999 | Wynn et al. |
| 5,983,196 | A | 11/1999 | Wendkos |
| 5,988,346 | A | 11/1999 | Tedesco et al. |
| 6,003,013 | A | 12/1999 | Boushy et al. |
| 6,012,983 | A | 1/2000 | Walker et al. |
| 6,068,552 | A | 5/2000 | Walker et al. |
| 6,110,041 | A | 8/2000 | Walker et al. |
| 6,113,495 | A | 9/2000 | Walker et al. |
| 6,116,597 | A | 9/2000 | Rowe et al. |
| 6,139,431 | A | 10/2000 | Walker et al. |
| 6,186,896 | B1 | 2/2001 | Takeda et al. |
| 6,229,879 | B1 | 5/2001 | Walker et al. |
| 6,234,896 | B1 | 5/2001 | Walker et al. |
| 6,270,410 | B1 | 8/2001 | Demar et al. |
| 6,293,866 | B1 | 9/2001 | Walker et al. |
| 6,319,122 | B1 | 11/2001 | Packes, Jr. et al. |
| 6,327,351 | B1 | 12/2001 | Walker et al. |
| 6,368,215 | B1 | 4/2002 | Walker et al. |
| 6,390,917 | B1 | 5/2002 | Walker et al. |
| 6,500,068 | B2 | 12/2002 | Walker et al. |
| 6,530,835 | B1 | 3/2003 | Walker et al. |
| 6,582,310 | B1 | 6/2003 | Walker et al. |
| 6,846,238 | B2 | 1/2005 | Wells |
| 6,893,341 | B2 | 5/2005 | Walker et al. |
| 6,980,256 | B2 | 12/2005 | Cuccia |
| 7,033,276 | B2 | 4/2006 | Walker et al. |
| 7,094,149 | B2 | 8/2006 | Walker et al. |
| 7,101,282 | B2 | 9/2006 | Walker et al. |
| 7,198,572 | B2 | 4/2007 | Walker et al. |
| 7,241,219 | B2 | 7/2007 | Walker et al. |
| 7,311,605 | B2 | 12/2007 | Moser |
| 2002/0098888 | A1 | 7/2002 | Rowe et al. |
| 2004/0043813 | A1 | 3/2004 | Chamberlain et al. |
| 2004/0087360 | A1 | 5/2004 | Chamberlain et al. |
| 2004/0147309 | A1 | 7/2004 | Chamberlain et al. |
| 2005/0255921 | A1 | 11/2005 | Walker et al. |
| 2008/0113789 | A1 | 5/2008 | Canessa et al. |
| 2008/0139306 | A1 | 6/2008 | Lutnick et al. |
| 2011/0212765 | A1 | 9/2011 | Walker et al. |

FOREIGN PATENT DOCUMENTS

| | | |
|---|---|---|
| GB | 2 236 423 | 4/1991 |
| JP | 07-271697 | 10/1995 |
| JP | 08-287018 | 11/1996 |
| JP | 09-101986 | 4/1997 |

OTHER PUBLICATIONS

"Casino Free Chips—Online Casino Bonuses," (http://www.casinofreechips.com/), download date: Sep. 4, 2003 (2 pages).
"Discount Long Distance Digest News—Turn Your Phone Into a Slot Machine—With AT&T," DLD Digest, Mar. 14, 1996, (http://.www.the.digest.com/66/66-32.html.
"Free Online Casino Money for Free Gambling," (http://www.all-online-gambling-casinos.com/free__gambling.htmp), download date: Sep. 4, 2003 (2 pages).
"Fruit Machine free java mobile phone games game download," (http://www.themobilegamer.co.uk/fruitmachine.htm), download date: Sep. 3, 2003.
"Gambling for Minutes." (http://www.halfbakery.com/idea/Gambling_20for_20Minutes), download date: Sep. 3, 2003.
"Gecko Casino—on line casino gaming with free cash bonuses," (http://www.greenbaycaino.com/casinos/gecko__casino.htm), download date: Sep. 3, 2003.
"Mirage Resorts, Incorporated Licenses Video Conferencing Technology From C-Phone Corporation; C-Phone Hardware and Software Drives State-of-the-Art Video Customer Service Network in Slot Machines at Treasure Island," PR Newswire, Jan. 15, 1997, Section: Financial News.
Amendment and Response for U.S. Appl. No. 10/322,107, dated Oct. 14, 2003 (9 pages).
Amendment and Response to the Non-Final Office Action for U.S. Appl. No. 09/641,903, dated Jun. 28, 2002 (8 pages).
Curtis, Anthony, "MGM, WWF put off major developments," The San Diego Union-Tribune, Feb. 18, 2001, Section: Travel, p. D-10.
Dukart, James, "While New Ball Game," (http://www.phoneplusmag.com/argicles/081feat2.html), posted Aug. 2000.
Examiner Communication for U.S. Appl. No. 08/821,437, dated Oct. 1, 1999 (1 page).
From C-Phone Corp. "PR Newswire Association, Jan. 15, 1997" (2 pages).
International Preliminary Report for PCT/US98/05069, dated Dec. 1, 1998 (3 pages).
International Search Report for PCT/US98/05069, dated Jul. 17, 1998 (4 pages).
Interview Summary for U.S. Appl. No. 09/641,903, dated Sep. 17, 2002 (3 pages).
Notice of Allowability for U.S. Appl. No. 08/821,437, dated Aug. 30, 1999 (1 page).
Notice of Allowability for U.S. Appl. No. 08/821,437, dated May 15, 2000 (1 page).
Notice of Allowability for U.S. Appl. No. 09/641,903, dated Sep. 23, 2002 (1 page).
Notice of Allowance for U.S. Appl. No. 10/322,107, dated Apr. 15, 2005 (4 pages).
Notice of Non-Compliant Amendment for U.S. Appl. No. 10/655,969, dated Aug. 10, 2007 (4 pages).
Office Action for U.S. Appl. No. 08/821,437, dated Dec. 3, 1998 (10 pages).
Office Action for U.S. Appl. No. 09/640,903, dated Jan. 10, 2002 (9 pages).
Office Action for U.S. Appl. No. 10/322,107, dated Apr. 11, 2003 (4 pages).
Office Action for U.S. Appl. No. 10/322,107, dated Jan. 29, 2004 (5 pages).
Office Action for U.S. Appl. No. 10/322,107, dated Sep. 30, 2004 (2 pages).
Office Action for U.S. Appl. No. 10/655,969, dated Apr. 3, 2008 (7 pages).
Office Action for U.S. Appl. No. 10/655,969, dated Dec. 5, 2007 (6 pages).

(56) References Cited

OTHER PUBLICATIONS

Office Action for U.S. Appl. No. 10/655,969, dated Feb. 5, 2007 (7 pages).
Office Action for U.S. Appl. No. 11/186,098, dated Oct. 10, 2007 (5 pages).
Office Action for U.S. Appl. No. 11/456,896, dated Jan. 24, 2008 (6 pages).
Response to Rule 312 Communication for U.S. Appl. No. 10/322,107, dated Jan. 11, 2006 (2 pages).
Second Preliminary Amendment for U.S. Appl. No. 09/641,903, dated Sep. 8, 2000 (6 pages).
Third Party Submission in Published Application Under 37 C.F.R. 1.99 filed for U.S. Appl. No. 13/313,818, dated May 25, 2012 (2 pages).
English translation of Abstract and paragraphs [0007] and [0015] of JP08-287018 submitted with Third Party Submission in Published Application Under 37 C.F.R. § 1.99 for U.S. Appl. No. 13/313,818 (2 pages).
English translation of Abstract and paragraph [0030] of JP07-271697 submitted with Third Party Submission in Published Application Under 37 C.F.R. § 1.99 for U.S. Appl. No. 13/313,818 (2 pages).
English translation of Abstract and paragraph [0089] of JP09-101986 submitted with Third Party Submission in Published Application Under 37 C.F.R. § 1.99 for U.S. Appl. No. 13/313,818 (2 pages).

400

| | PLAYER DEVICE IDENTIFIER 410 | TYPE OF DEVICE 420 | CURRENTLY IN POSSESSION OF 430 | PAYMENT IDENTIFIER FOR SECURITY 440 |
|---|---|---|---|---|
| 445 | DEVICE-1-24579282 | CORDLESS TELEPHONE | PLAYER-1-02834555 | CREDIT CARD NUMBER |
| 450 | DEVICE-2-24579282 | PORTABLE TELEVISION SET | PLAYER-2-02834555 | CASH DEPOSIT |
| 455 | DEVICE-3-24579282 | PERSONAL DIGITAL ASSISTANT | PLAYER-3-02834555 | NONE REQUIRED |
| 460 | DEVICE-4-24579282 | CELLULAR TELEPHONE | PLAYER-4-02834555 | HOTEL ROOM NUMBER |
| 465 | DEVICE-5-24579282 | COMBINATION TV / DVD PLAYER | PLAYER-5-02834555 | DEBIT CARD NUMBER |
| 470 | DEVICE-6-24579282 | TELEPHONE HANDSET W/ CORD | CASINO DESK | N/A |
| 475 | DEVICE-7-24579282 | CORDLESS TELEPHONE | REPAIR SHOP | N/A |

FIG. 4

500

| | PLAYER IDENTIFIER 510 | NAME 520 | COMP POINTS 530 | AVERAGE RATE OF PLAY 540 | CURRENT CREDIT BALANCE 550 | DURATION OF CURRENT SESSION 560 |
|---|---|---|---|---|---|---|
| 565 | PLAYER-1-02834555 | ANNE RED | 1,846 POINTS | 22.3 COINS/MIN | 112 COINS | 89 MIN 12 SEC |
| 570 | PLAYER-2-02834555 | JEFF YELLOW | 2,187 POINTS | 14.8 COINS/MIN | 83 COINS | 6 MIN 4 SEC |
| 575 | PLAYER-3-02834555 | JIM BLUE | 579 POINTS | 12.1 COINS/MIN | 52 COINS | 32 MIN 39 SEC |
| 580 | PLAYER-4-02834555 | ALICE ORANGE | 8,902 POINTS | 16.3 COINS/MIN | 67 COINS | 115 MIN 45 SEC |
| 585 | PLAYER-5-02834555 | JOHN GREEN | 2,984 POINTS | 24.0 COINS/MIN | 19 COINS | 72 MIN 13 SEC |

FIG. 5

600

| | PLAYER IDENTIFIER 610 | CONDITION 620 | CONDITION TRUE? 630 | SERVICE PROVIDED 640 | PLAYER DEVICE 650 |
|---|---|---|---|---|---|
| 655 | PLAYER-1-02834555 | RATE_OF_PLAY >= 15 COINS/MIN | YES | 1 MINUTE PHONE SERVICE FOR EACH MINUTE OF GAME PLAY | DEVICE-1-24579282 |
| 660 | PLAYER-2-02834555 | RATE_OF_PLAY >= 15 COINS/MIN | NO | NONE | DEVICE-2-24579282 |
| 665 | PLAYER-3-02834555 | CREDIT_BALANCE >= 50 COINS | YES | 100 KB INTERNET ACCESS PER COIN BET | DEVICE-3-24579282 |
| 670 | PLAYER-4-02834555 | 3D_GRAPHICS_MODE_ENABLED | YES | 1.2 MINUTES OF PHONE SERVICE PER COIN WON | DEVICE-4-24579282 |
| 675 | PLAYER-5-02834555 | THEORETICAL_WIN_PER_MINUTE > COST_OF_SERVICE_PER MINUTE | YES | FREE VIEWING OF PREMIUM MOVIE CHANNEL | DEVICE-5-24579282 |

FIG. 6

700

| | PLAYER DEVICE IDENTIFIER 710 | CURRENTLY IN POSSESSION OF 720 | MINUTES OF SERVICE EARNED 730 | MINUTES OF SERVICE USED 740 |
|---|---|---|---|---|
| 745 | DEVICE-1-24579282 | PLAYER-1-02834555 | 85 | 78 |
| 750 | DEVICE-2-24579282 | PLAYER-2-02834555 | 2 | 0 |
| 755 | DEVICE-3-24579282 | PLAYER-3-02834555 | N/A | N/A |
| 760 | DEVICE-4-24579282 | PLAYER-4-02834555 | 30 | 32 |
| 765 | DEVICE-5-24579282 | PLAYER-5-02834555 | 102 | 102 |
| 770 | DEVICE-4-24579282 | CASINO DESK | N/A | N/A |
| 775 | DEVICE-5-24579282 | REPAIR SHOP | N/A | N/A |

FIG. 7

METHOD AND APPARATUS FOR PROVIDING A COMPLIMENTARY SERVICE TO A PLAYER

PRIORITY CLAIM

This application is a continuation of, claims priority to and the benefit of U.S. patent application Ser. No. 13/722,640, filed on Dec. 20, 2012, which is a continuation of, claims priority to and the benefit of U.S. patent application Ser. No. 13/313,818, filed on Dec. 7, 2011, which is a continuation of, claims priority to and the benefit of U.S. patent application Ser. No. 10/655,154, filed on Sep. 4, 2003, now U.S. Pat. No. 8,087,996, which claims priority to and the benefit of U.S. Provisional Patent Application No. 60/408,473, filed on Sep. 4, 2002 and which is a continuation-in-part of, claims priority to and the benefit of U.S. patent application Ser. No. 10/322,107, filed on Dec. 18, 2002, now U.S. Pat. No. 7,101,282, which is a continuation of, claims priority to and the benefit of U.S. patent application Ser. No. 09/641,903, filed on Aug. 18, 2000, now U.S. Pat. No. 6,530,835, which is a continuation of, claims priority to and the benefit of U.S. patent application Ser. No. 08/821,437, filed on Mar. 21, 1997, now U.S. Pat. No. 6,139,431, the entire contents of each are incorporated herein by reference.

BACKGROUND

Casinos profit from their patrons frequently playing their gaming machines, such as slot machines, video poker or video blackjack. Each gambling machine is designed to ensure that, on average, the casino retains a predetermined percentage of the total amount gambled (the hold percentage or "vig"). In fact, gaming machines generally have a very high hold percentage, often surpassing the table games of blackjack, roulette or craps.

Thus, the more such gambling machines are played, the greater is the revenue to the casino. Accordingly, it is highly desirable to provide ways to maintain player interest and keep players of gambling machines playing longer. Moreover, casinos are always looking for new, fun ways to attract players to the slot machines, as well as to draw existing players away from competing casinos.

Thus in general, casinos would like to find new ways to attract players and to make a player's gaming experience more enjoyable. Casinos would also like to provide benefits to players in a convenient and cost-effective manner.

BRIEF DESCRIPTION OF THE DRAWINGS

FIG. 4 shows one embodiment of a player device database that may be stored by the controller.

FIG. 5 shows one embodiment of a player database that may be stored by the controller.

FIG. 6 shows one embodiment of a condition database that may be stored by the controller.

FIG. 7 shows one embodiment of a service tracking database that may be stored by the controller.

DETAILED DESCRIPTION

Figure 1A:
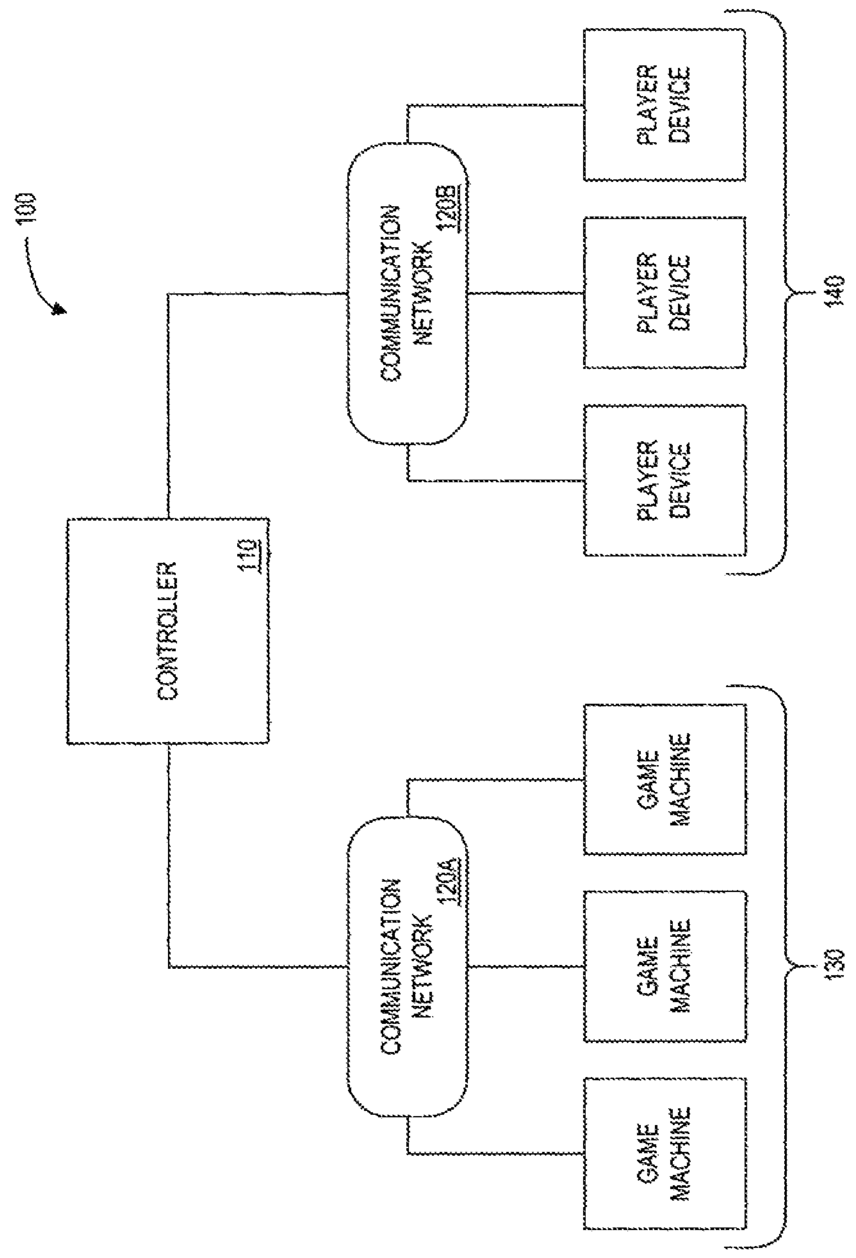
FIG. 1A shows one embodiment of a system that implements the invention.

The present invention is described herein, as are a variety of differing embodiments of the invention.

According to one embodiment, the invention allows a player at a casino to receive a service through a player device, based on his gaming activities. For example, a player may receive free long distance telephone service through a cordless phone as long as he maintains a rate of play of at least twenty coins per minute at a slot machine.

A variety of different types of player devices are possible, including a cordless telephone, a cell phone, a personal digital assistant (PDA), a notebook computer, or a portable television set. According to one embodiment, a player device may be provided to a player by a casino (e.g., as a rental, or requiring a security deposit).

According to one embodiment, a casino may operate a controller that monitors a player's activities at one or more game machines (e.g., slot machines, video poker machines) and determines whether to provide a service to the player. For example, a service may be provided to a player as long as the player operates a game machine at a certain rate of play. According to one embodiment, the controller may determine what service to provide to a player or how much of a service to provide. For example, a player may receive 100 kilobytes of Internet access for each coin that he bets at a slot machine.

A variety of different services may be provided by a player device based on a player's gaming activities. For example, players may receive communications services like free telephone calls, free Internet access, or free viewing of a television channel. According to one embodiment, a player device may communicate with the controller or a communications server in order to provide a service to a player.

According to one embodiment, a player device may also output messages or alerts to a player based on the service that is provided. For example, a player's free telephone call may be interrupted to alert the player that he only has 5 minutes of free telephone talk time remaining and that he should gamble more quickly in order to earn more telephone talk time.

The following terms are used in the present application.

A player is at least one entity who operates a game machine.

A casino is an entity that enables a player to play a game (e.g., by operating a game machine).

A game machine can be any electronic or electromechanical device that is operated by a player to play a game. Examples of game machines include slot machines, video poker machines, video games, and pachinko machines.

A controller includes a computer system operated by a casino, which may communicate with one or more game machines or one or more player devices. According to one embodiment, the controller may determine a service to provide to a player based on his gambling activities.

A player device is an electronic device that may provide a service to a player. Examples of player devices include: a cordless telephone, a cellular phone, a notebook computer, a portable television.

Gaming activities include activities by a player that may relate to gaming. Examples of gaming activities include playing one or more spins on a slot machine, maintaining a certain rate of play on a video poker machine, or maintaining a certain credit balance on a pachinko machine.

A service may be provided to a player based on his gaming activities. Examples of services include local telephone service, long-distance telephone service, Internet service, and messaging service.

An authentication code may be, for example, an alphanumeric code, which indicates gaming activities by a player, and which may indicate or prove a player's operation of the game machine.

An activation code may be, for example, an alphanumeric code which indicates that a service should be provided to a player. An authentication code may function as an activation code.

The following example provides an illustrative usage of one embodiment of the invention. Alice may visit a casino that has a special promotion going on: players get to make free long distance phone calls while they gamble. To sign up for the promotion, Alice visits a booth at the casino that is manned by three friendly casino employees. They explain to Alice how the promotion works: For every minute that Alice spends gambling at a slot machine, she gets one minute of long distance telephone service. She can call anyone she wants to in the continental United States, and can talk for as long as she wants (just so long as she keeps gambling at a reasonable rate). The casino will even lend Alice a cordless phone to use in making her phone calls. There's no sign-up fee and no hidden charges.

Alice decides to sign up for the promotion. In order to sign up, she needs to have a player tracking card. Most of the other people who are signing up for the promotion already have player tracking cards, but since Alice is new to the casino, she has to fill out a form to sign up for a card. The casino employees issue Alice a player tracking card, and tell her that she can use it to earn other great benefits at the casino like free meals and show tickets.

Next, Alice gets to pick out what phone she would like to use. If Alice had a cell phone, she could use this for the service, but since she doesn't, she can borrow one of the casino's telephones. The casino employees at the booth offer her a choice of phones: a cordless hands-free phone, a more traditional looking cordless phone. Alice picks the hands-free phone—it'll be easier for her to use while she's playing video poker. Since she's only borrowing the phone from the casino, Alice has to provide her credit card number for security purposes. The casino employees assure her that they'll only charge her credit card if she doesn't return the phone. If Alice returns the phone on time in working order, she won't be charged a thing. As a final step, one of the casino employees swipes Alice's player tracking card number through a magnetic stripe reader and records an identification number on her hands-free phone and enters them into a computer—this will ensure that Alice gets credit for all the phone minutes that she deserves.

Now that Alice has her player tracking card and her phone, she's ready to go! She heads out onto the casino floor and finds her favorite slot machine—a Wheel of Riches game with a bonus round. When Alice inserts her player tracking card into the machine, the green LED on the hands-free phone lights up—this means that the phone is ready to go. The phone also has an LCD display that shows Alice's balance of minutes—currently "5 minutes", since Alice hasn't started gambling yet. (The casino gives Alice 5 free minutes so that she doesn't have to wait to build up a balance of phone minutes before she can make a phone call.)

Alice decides to make her first phone call. Using a numeric keypad on her phone, she dials the number of her boyfriend Bob back in New York City. After a brief delay, the phone rings a few times, and then Bob picks up. Alice proceeds to talk on the phone with Bob, discussing everything from her trip to Las Vegas to her current gaming activities at the Wheel of Riches slot machine. Of course, all of Alice's stories about Las Vegas remind Bob that he wants to make a trip out to Los Vegas sometime too; he makes a note to himself to mention the idea to his friends at their next softball game.

Alice is allowed to continue talking on the phone with Bob for free for as long as she likes, just so long as she maintains a rate of play of at least 15 coins per minute. While 15 coins per minute is a bit faster than Alice usually gambles, she's willing to play a little faster for the convenience of being able to talk on the phone with Bob for free.

At one point, Alice stops gambling for a few minutes as she tells Bob a story about the musical she saw last night. When the balance of minutes on her phone gets down to 2 minutes, a recorded voice interrupts their conversation. "You have only 2 minutes remaining. Please start gambling again to avoid having your telephone call be disconnected." Alice quickly responds by placing few bets on the slot machine and getting her average rate of play up to an acceptable level of 15 coins per minute. Since Alice is now gambling at more than 20 coins per minute, she earns phone minutes at an even better rate of 1.1 phone minutes for each minute spent gambling. Her increasing balance of phone minutes is shown on the LCD screen on her telephone.

Alice continues talking on the phone with Bob for a while longer and then calls her mother in Los Angeles. While she's on the phone with her mother, Alice decides to stop playing Wheel of Riches and switch over to video poker. Since she's built up a balance of 8 minutes on her telephone, she has plenty of time to remove her player tracking card from the Wheel of Riches machine, walk over to the video poker machine, insert her player tracking card into the video poker machine, and start gambling at the video poker machine. At the video poker machine, Alice earns 10 seconds of phone time for each hand of video poker that she plays.

After a couple of hours of gambling, Alice has exhausted the money in her wallet and is getting hungry. So she finishes gambling and uses up her last few minutes of phone time talking on the phone with her friend Claire from Seattle. To return the phone that she borrowed from the casino, she places it in a deposit box next to the door of the casino. At the end of the day, a casino employee will collect all the phones in the deposit box, enter into the computer system that they have been returned on time, and recharge the phones' batteries so that the phones can be lent out to other players the next day.

Various embodiments provide benefits to players, casinos and/or service providers. For example, a player may receive a benefit of a service based on his gambling. Thus the player can be made happier. Further, friends of a player may receive a benefit of communicating with the player. A casino or other provider of gaming services may receive increased revenue from players, who may be happier and gamble more. A service provider (e.g., a phone company) likewise can receive increased revenues

System

Referring now to FIG. 1A, an apparatus 100 according to embodiments of the present invention includes a controller 110 that is in communication with one or more game machines 130, and with one or more player devices 140. The controller 110 may communicate with the game machines 130 and the player devices 140 directly or via a communication network of any known type or types. Possible communication networks include: a local area network (LAN), a wide area network (WAN), the Internet, a telephone line, a cable line, a radio channel, an optical communications line, a satellite communications link. In FIG. 1A, such communication is illustrated as taking place through communication networks 120*a* and 120*b*.

Possible communications protocols include: Ethernet, Bluetooth, TCP/IP, 802.11. According to one embodiment, communication may be encrypted to ensure privacy and prevent fraud.

The communication referred to herein can allow any or all of several types of communication to take place. For example, the controller may transmit information to a game machine (e.g., to control its operation), and a game machine may transmit information to the controller (e.g., information about a player's gaming activities)

The controller may transmit information to a player device, and a player device may transmit information to the controller. A player device may provide communications service to a player.

Note that both wireline and wireless communication networks are possible. According to one embodiment, a wireless communication network that is used to communicate with a player device may have a limited range (e.g., 10-20 feet). Advantages of this include the following:

Transmission frequencies may be reused in different areas of a casino. For example, a first player device may communicate on a frequency band in a first room of casino, and a second player device may communicate on the same frequency band in a second room of the casino. Since the two player devices may be separated by a relatively large distance (e.g., 100 ft), they may not interfere with each other.

Low-power transmissions are not regulated by the FCC.

Low-power transmissions do not consume as much power, meaning that player devices may include smaller power supplies or operate for longer periods of time before needing to be recharged.

In one embodiment of the system, shorter communication ranges for player devices may make it more difficult for cheaters to steal services based on another player's gaming activities. For example, a cheater who has a player device may sneak up behind a player who is operating a game machine and attempt receive free services based on the player's gaming activities. Reducing the communications range of the player device may force the cheater to stand closer to the player and thereby make him easier to detect.

The controller 110 may communicate with a game machine to monitor gaming activities at that game machine. Similarly, each player device may be operated by a player, and may communicate with the controller to enable the player device to provide a service to the player.

Each of the game machines 130 and the player devices 140 may comprise computers, such as those based on the Intel® Pentium® processor, that are adapted to communicate with the controller 110. Any number of game machines 130 and the player devices 140 may be in communication with the controller 110, though three each are illustrated in FIG. 1A.

Examples of game machines include a slot machine (e.g., located in a casino or riverboat), a video poker terminal, a video lottery terminal, a pachinko machine, a table-top game (e.g., located in a bar or other commercial establishment), a personal computer (e.g., to communicate with website that provides gambling services), a telephone (e.g., to communicate with an automated sports book that provides gambling services), a portable handheld gaming device (e.g., a personal digital assistant or Nintendo GameBoy), a skill crane, a skee-ball machine, a video game and a set-top box (e.g., HotelNet).

In embodiments of the invention addressing table games such as blackjack, craps, roulette, poker, baccarat, keno, bingo, and the like, the game machine may be hardware (e.g., a table-top box) located at the game table suitable for tracking events at the game table.

According to one embodiment, a game machine may enable a player to play a game of chance (e.g., bingo). Alternatively, a game machine may enable a player to play a game of skill (e.g., chess).

Game machines are well known to those skilled in the art, and need not be described in further detail herein.

Communication between the game machines 130, the player devices 140 and the controller 110 may be direct or indirect, such as over the Internet through a Web site maintained by controller 110 on a remote server or over an on-line data network including commercial on-line service providers, bulletin board systems and the like. In yet other embodiments, the devices may communicate with controller 110 over RF, cable TV, satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 110 may function as a "Web server" that generates Web pages (documents on the Web that typically include an HTML file and associated graphics and script files) that may be accessed via the Web and allows communication with the controller 110 in a manner known in the art.

Any or all of the game machines 130 and the player devices 140 may be, e.g., conventional personal computers, portable types of computers, such as a laptop computer, a palm-top computer, a hand-held computer, or a Personal Digital Assistant (PDA).

Figure 1B:
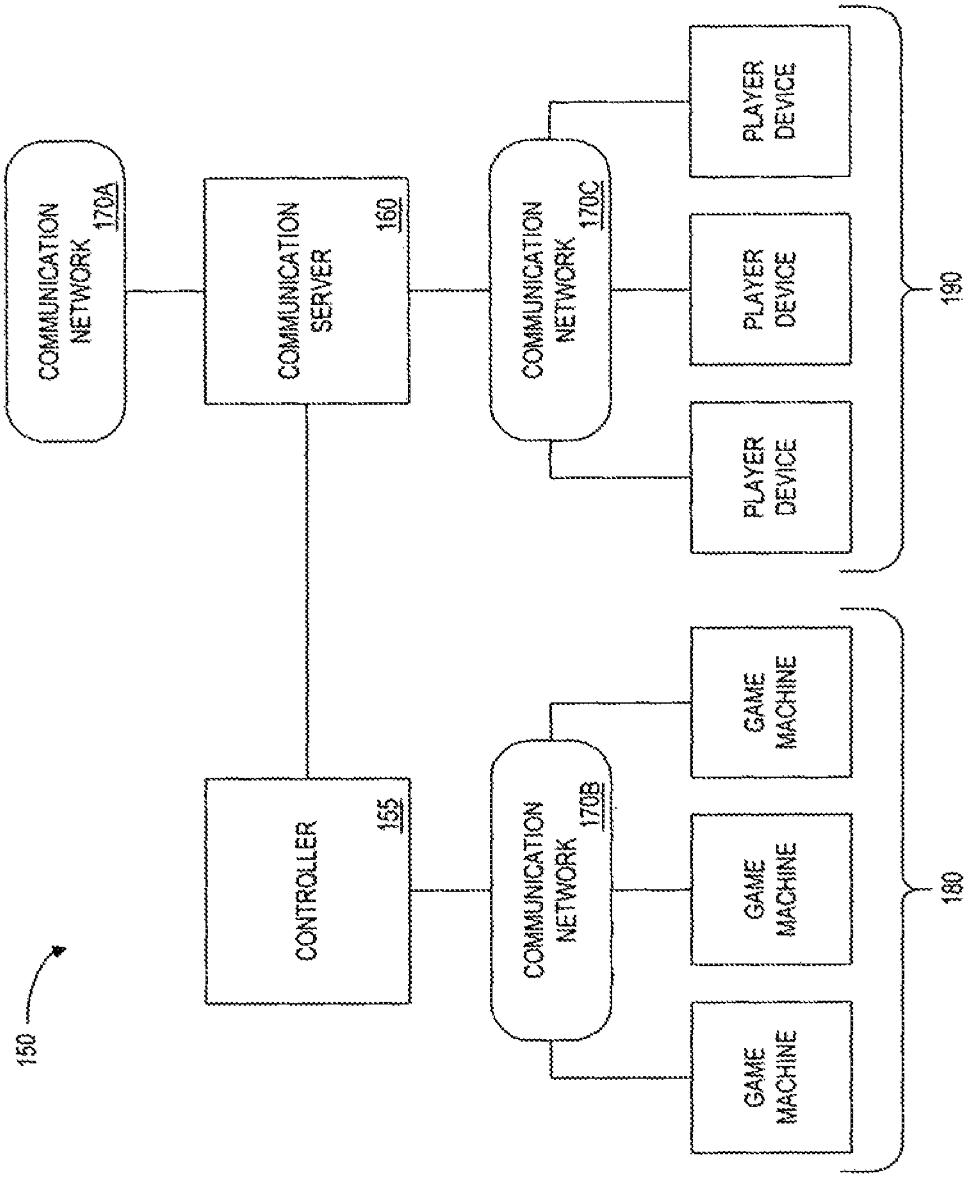
FIG. 1B shows a second embodiment of a system that implements the invention.

FIG. 1B depicts another embodiment of a system according to the present invention. FIG. 1B likewise indicates components described above with respect to FIG. 1A. This embodiment includes one or more communication servers 160. According to one embodiment, the controller 155 may communicate with the communication server 160 to provide communications services to a player who is using a player device 190.

According to various embodiments, a communication server may comprise, for example, a PBX (private branch exchange) for a telephone network (e.g., to provide telephone service, including long distance telephone service); a web proxy server (e.g., to provide Internet access as service); a video-on-demand server (e.g., to provide video services, including movies, sporting events, and television shows); and/or a digital media server (e.g., to provide music, movies, or communicate other forms of digital media).

As used herein, the terms "service provider" and "media server" also indicate a "communication server".

According to one embodiment, a player device may connect to a communication server that is separate from the controller. This communication server may then provide a service to the player device.

According to one embodiment, a communication server may provide service to a player device based on an indication by the controller. For example, the controller may indicate to a player device that it should connect to a communication server. In response to this indication, the player device may connect to the communication server and provide a service to a player. According to one embodiment, the controller may provide a password, authentication code, or other indication that allows a player device to connect to a communication server.

As another example, the controller may indicate to a communication server that it should provide a service to a player device. For example, a communication server may be a PBX switch. The controller may transmit an indication to the PBX switch that it should allow a player device (e.g., a cellular telephone) to make phone calls.

As another example, the controller may indicate to a communication server what amount of a service it should provide to a player device. For example, a communication server may be a calling card server. To provide a service to a player, the controller may add minutes to a calling card account. To make a phone call, a player may telephone the calling card server and enter a calling card number corresponding to the calling card account. The communication server may continue to provide telephone service to the player as long as there are minutes left on the calling card account.

Devices

Figure 2:
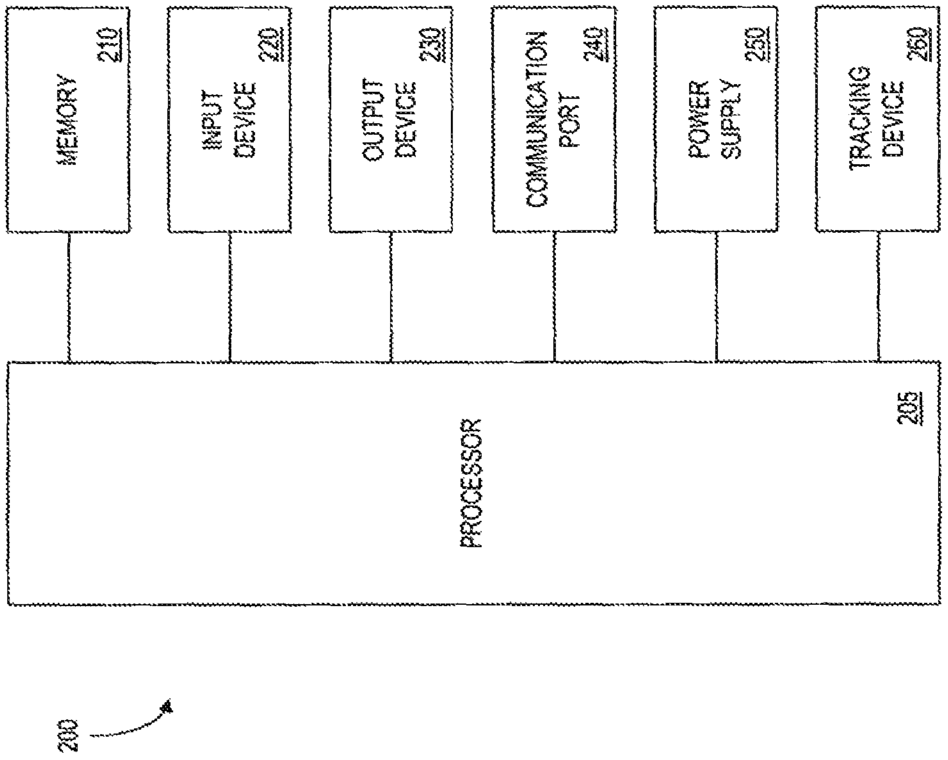
FIG. 2 shows one embodiment of a player device.

FIG. 2 shows one embodiment 200 of a player device. This embodiment includes a processor 205, a memory 210, at least one input device 220, at least one output device 230, a communication port 240, a power supply 250 and a tracking device 260.

The player device may be embodied as, e.g., cordless telephone, a cell phone, a PDA (personal digital assistant), a notebook computer, a handheld device, a two-way radio (e.g., a walkie-talkie), a one-way radio (e.g., AM-FM radio), a disposable cell phone (e.g., from Telespree, Dieceland Technologies, or New Horizons Technologies International), a corded telephone handset, a portable television set, a portable combination TV/VCR or combination TV/DVD player, a CD player, an electric foot massager, an MP3 player, a camera (e.g., a digital camera), a handheld lottery terminal or a video game player (e.g., a Nintendo GameBoy).

Some embodiments of a player device may not include all of the components illustrated in FIG. 2. For example, a cordless telephone that has no memory may operate as a player device. In a second example, an FM radio that has no input device may operate as a player device. Also, some embodiments of a player device may include additional components.

The processor 205 (also referred to as "CPU" or "central processing unit") may include a microprocessor suitable for executing instructions and performing processes. For example, a game machine may include an Intel Pentium III microprocessor. According to one embodiment, a controller may include a plurality of processors.

The memory 210 may include volatile or non-volatile memory, or a combination thereof. This memory may be electronic, capacitive, inductive, and/or magnetic. Examples of memory include RAM (random access memory), ROM (read-only memory), a magnetic disk drive and an optical drive. Examples of information that may be stored in memory include a program (e.g., to control operation of the player device) and entertainment content (e.g., to provide to a player as a service). For example, a player device may be a combination TV/DVD player that includes a DVD movie. Based on a player's game activities, the DVD movie may be provided to the player as a service.

The input device 220 is used to receive an input from a player. Examples of input devices include, e.g., any appropriate combination of a computer keyboard, a computer mouse, a touch screen, a microphone, a video camera, a magnetic stripe reader (e.g., to read a player tracking card), a biometric input device (e.g., a fingerprint or retinal scanner), an radio antenna, a voice recognition module, a coin or bill acceptor.

For player devices, common input devices include a numeric keypad on a telephone, a microphone on a telephone, and channel up/down buttons on a portable television set.

The output device 230 is used to output information from a game machine to a player. Examples of output devices include: a video monitor, a light-emitting diode (LED), an audio speaker, an electric motor, a printer, a radio antenna, an infra-red port (e.g., for communicating with a second slot machine), a Braille computer monitor, a floppy disk drive. A player device may include wireline or wireless communications capabilities.

For player devices, common output devices include an audio speaker on a telephone handset, headphones for a hands-free telephone, an LCD display on a PDA (personal digital assistant).

The communication port 240 facilitates at least one connection to one or more communication networks in any known manner. For example, a player device may communicate with a controller to determine when to provide a benefit to player or communicate with a communication server to provide communication services to a player.

The power supply 250 includes a source of energy to operate electronics and other aspects of a player device. Examples of energy sources include alkaline batteries, lithium batteries, nickel-metal hydride batteries, lead-acid batteries, fuel cells (e.g., those made by PolyFuel), solar cells, solar panels, a power line (e.g., a 120V alternating current connection, a 12V direct current connection), and an internal combustion engine.

The tracking device 260 is used to determine the location of the player device. A tracking device may be particularly useful in preventing players from accidentally or intentionally taking the player devices outside of a casino or some other designated area (e.g., the Las Vegas strip).

Examples of tracking devices include a GPS (global positioning system) card and antenna, and a radio frequency identification (RFID) tag. For example, a casino may include exit gates similar to those in department stores. If a player attempts to exit the casino while carrying a player device that has a RFID tag, then an alarm may sound or a casino employee may be alerted. RFID tags are an inexpensive and effective manner of insuring that player devices are kept within a certain perimeter.

Figure 3:
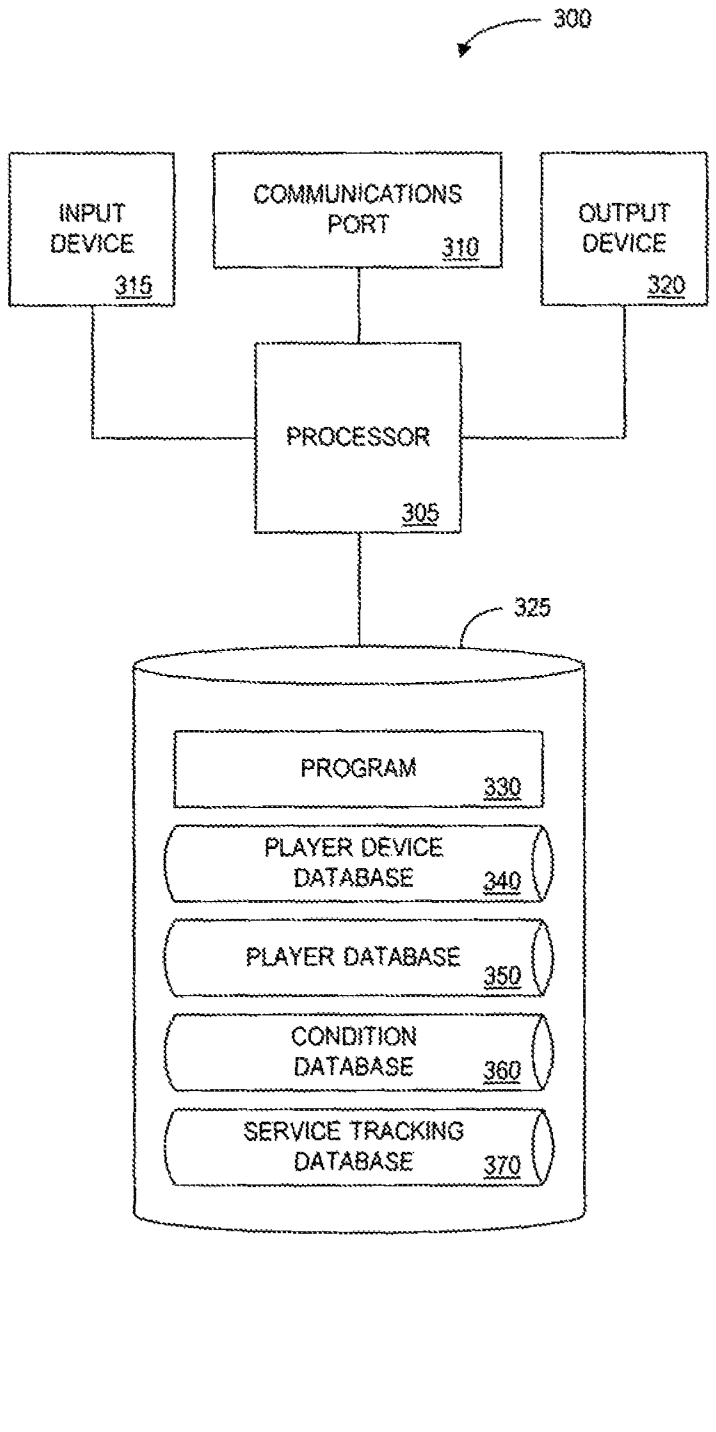
FIG. 3 shows one embodiment of the controller shown in FIG. 1A and FIG. 1B.

Referring to FIG. 3, the controller 300 comprises a processor 305, such as one or more Intel® Pentium® processors. The processor 305 is coupled to a communication port 310 through which the processor 305 communicates with other devices.

The processor is also in communication with one or more input devices 315 and one or more output devices 320. Examples of input devices include, e.g., any appropriate combination of a computer keyboard, a computer mouse, a touch screen, a microphone, a video camera, a magnetic stripe reader (e.g., to read a player tracking card), a biometric input device (e.g., a fingerprint or retinal scanner), an radio antenna, a voice recognition module, a coin or bill acceptor. Examples of output devices include: a video monitor, a light-emitting diode (LED), an audio speaker, an electric motor, a printer, a radio antenna, an infra-red port (e.g., for communicating with a second slot machine), a Braille computer monitor, a floppy disk drive. A player device may include wireline or wireless communications capabilities.

The processor 305 is also in communication with a data storage device 325. The data storage device 325 comprises an appropriate combination of magnetic, optical and/or semiconductor memory, and may include, for example, Random Access Memory (RAM), Read-Only Memory (ROM), a compact disc and/or a hard disk. The processor 305 and the storage device 325 may each be, for example: (i) located entirely within a single computer or other computing device; or (ii) connected to each other by a remote communication medium, such as a serial port cable, telephone line or radio frequency transceiver. In one embodiment, the controller may comprise one or more computers that are connected to a remote server computer for maintaining databases.

The data storage device stores a program 330 for controlling the processor 305. The processor 305 performs instructions of the program, and thereby operates in accordance with the present invention, and particularly in accordance with the methods described in detail herein. The program may be stored in a compressed, uncompiled and/or encrypted format. The program furthermore includes program elements that may be necessary, such as an operating system, a database management system and "device drivers" for allowing the processor 305 to interface with computer peripheral devices. Appropriate program elements are known to those skilled in the art, and need not be described in detail herein.

According to an embodiment of the present invention, the instructions of the program may be read into a main memory from another computer-readable medium, such from a ROM to RAM. Execution of sequences of the instructions in program causes processor 305 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 325 also stores (i) a player device database 340, (ii) a player database 350, (iii) a condition database 360, and (iv) a service tracking database 370. The databases 340, 350, 360 and 370 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein.

Databases

Player Device Database

FIG. 4 is a tabular representation 400 of the player database. The tabular representation 400 of the database includes a number of example records 445-475 (or entries) each defining a player device which may have been provided to a player. Those skilled in the art will understand that the database may include any number of entries. The tabular representation of the database also defines fields for each of the entries or records. The fields specify: (i) a player device identifier 410; (ii) a type of device 420; (iii) an indication 430 of which party (e.g., what player) currently possesses the device; and (iv) payment identifier for security purposes.

Player Database

FIG. 5 is a tabular representation 500 of the player database. The tabular representation 500 of the database includes a number of example records 565-585 (or entries) each defining a player. Those skilled in the art will understand that the database may include any number of entries. The tabular representation of the database also defines fields for each of the entries or records. The fields specify: (i) a player identifier 510; (ii) a player name 520; (iii) comp points 530 that have been earned by the player; (iv) average rate of play 540 (e.g., on average); (v) a current credit balance 550 the player currently has stored at a game machine; and (vi) the duration 560 of current gaming session (e.g., whether a continuous or semi-continuous period of gaming activity).

Condition Database

FIG. 6 is a tabular representation 600 of the player database. The tabular representation 600 of the database includes a number of example records 655-675 (or entries) each defining a condition for providing service. Those skilled in the art will understand that the database may include any number of entries. The tabular representation of the database also defines fields for each of the entries or records. The fields specify: (i) a player identifier 610; (ii) a condition 620 for providing a service (e.g., when the condition is true); (iii) whether the condition is true 630; (iv) a service 640 to be provided to the player (e.g., if the condition is true; and (v) a player device 650 that may provide the service to the player.

Service Tracking Database

FIG. 7 is a tabular representation 700 of the player database. The tabular representation 700 of the database includes a number of example records 745-775 (or entries) each defining a player device. Those skilled in the art will understand that the database may include any number of entries. The tabular representation of the database also defines fields for each of the entries or records. The fields specify: (i) a player device identifier 710; (ii) an indication 720 of which party (e.g., what player) currently possesses the device; (iii) the minutes 730 of service earned (if any); (iv) the minutes 740 of service already used or consumed.

In FIG. 7, the entry 745 indicates that PLAYER-1-02834555 has spent 78 minutes talking on DEVICE-1-24579282 (e.g., a cordless phone). In general the number of minutes of service used will be less than the number of minutes of service earned (i.e., a player can't use what he hasn't earned), but it is also possible for the number of minutes of service used to be greater than the number of minutes of service earned (e.g., a player may be extended credit to use a service).

Figure 8:
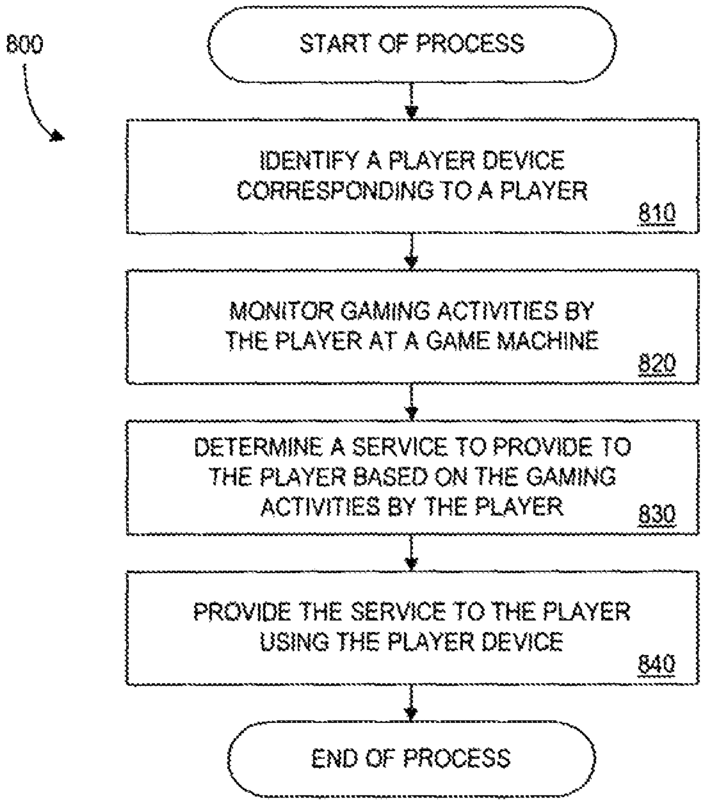
FIG. 8 shows a flowchart corresponding to a process according to an embodiment of the invention.

Referring to FIG. 8, a flow chart 800 represents an embodiment of the present invention. The particular arrangement of elements in the flow chart of FIG. 8, as well as the other flow charts discussed herein, is not meant to imply a fixed order to the steps; embodiments of the present invention can be practiced in any order that is practicable.

A player device corresponding to a player is identified (step 810), and gaming activities by the player are monitored (step 820). A service to be provided is determined (step 830). As described herein, the service and/or determination thereof is based on gaming activities of the player. The service is provided (step 840) to the player using the player device.

Figure 9:
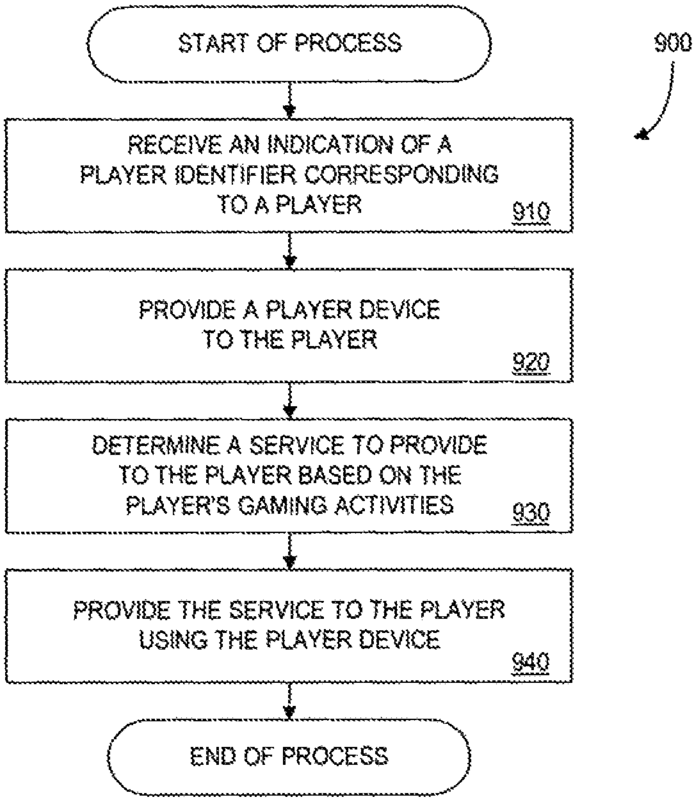
FIG. 9 shows a flowchart corresponding to a process according to an embodiment of the invention.

Referring to FIG. 9, a flow chart 900 represents an embodiment of the present invention similar to that illustrated in FIG. 8.

A player identifier is received (step 910), and a player device is provided to the player (step 920). A service to be provided is determined (step 930). As described herein, the service and/or determination thereof is based on gaming activities of the player. The service is provided (step 840) to the player using the player device.

With respect to both FIGS. 8 and 9, the player device of the player may obtained from a variety of different parties, including a casino, a merchant and an automated dispenser. For example, a player may borrow a player device from the front desk at a casino. In a second example, a player device may be placed in a player's hotel room at a casino for the player to pick up when he checks into the hotel. Alternatively, a player may purchase or rent a player device from a merchant that maintains a shop in casino. Alternatively, a vending machine located in the lobby of a casino may be configured to dispense player devices to players. An automated dispenser may include various input devices to enable it to receive inputs from a player (e.g., a player identifier, a payment identifier, consideration).

According to one embodiment, a player may provide a player identifier when obtaining a player device. Examples of player identifiers include a player's name (e.g., first name, last name), a player's home address, a player's home telephone number, a player tracking card number, a player's hotel room number (e.g., if a player is staying at a hotel that is associated with a casino), a player's email address, a payment identifier belonging to the player.

Obtaining a player identifier from a player may help in monitoring gaming activities by the player, and deter players from stealing player devices.

According to one embodiment, a player may provide a payment identifier when obtaining a player device. Examples of payment identifiers include a credit card number, a debit card number, a financial account number (e.g., a bank account number), a home billing address, a player's hotel room number (e.g., if a player is staying at a hotel that is associated with a casino).

Obtaining a payment identifier from a player may be useful in obtaining a payment from a player (e.g., a rental or lease payment for using a player device).

According to one embodiment, a player may provide a security deposit other consideration to obtain a player device. According to one embodiment, a security deposit may be any form of consideration (e.g., money, alternate currencies, products, services). According to one embodiment, a security deposit may be returned to a player if the player returns the player device.

According to one embodiment, the cost of renting a player device may be determined based on a player's gaming activities, gaming activities of other players, or one or more offers accepted by the player (e.g., an offer to receive a discounted rental price if the player performs an value-added activity).

According to one embodiment, the controller may store an indication that a particular player device corresponds to a particular player. For example, the controller may store a player device database such as the one shown in FIG. 4. Note that the player device database shown in FIG. 4 also stores an indication of a payment identifier that may be provided by a player to help insure that the player device is returned.

According to one embodiment, a player may receive a benefit of a service based on his performance of at least one gaming activity. Examples of gaming activities include operating a game machine (e.g., video poker machine, a slot machine), playing a table game (e.g., blackjack, craps), betting on a sporting event (e.g., a horse race, a boxing match), playing a game of chance (e.g., keno, a state lottery), playing a game of skill (e.g., a video game, a trivia quiz, a skill crane).

In order to determine what benefit (if any) to provide to a player, the controller may monitor gaming activities by the player. Information relating to gaming activities by a player may be referred to as "game data". For example the controller may monitor gaming activities by a player to determine the player's rate of play. If the player is playing a game machine at a rate of at least 20 coins per minute, then the player may receive a benefit (e.g., a service provided by a player device).

According to one embodiment, monitoring gaming activities may include receiving an indication of gaming activities from a device. Examples of devices that may provide indications of gaming activities include an electronic device operated by a casino employee, a game machine, a sensor (e.g., a video camera and/or image recognition software), a player device operated by a player (e.g., cellular telephone).

According to one embodiment, monitoring gaming activities may include identifying a player. For example, a game machine may transmit an indication of a player to the controller. A player may insert his player tracking card into a game machine. The game machine may obtain information identifying the player from the player tracking card (e.g., a player identification number) and transmit an indication of this information to the controller.

The controller may identify a player based on one or more records stored in a database. For example, the controller may identify a player using information stored in the player database shown in FIG. 5.

A casino employee may use an electronic device (e.g., a PDA or tablet computer with a wireless network connection) to identify a player who is playing a table game (e.g., blackjack, craps). For example, a cashier at an off-track betting parlor may type a player's identification number into a point-of-sale terminal. In a second example, a pit boss at a casino may observe a player who is gaming at a craps table. If the player appears to be making large bets and playing continuously, the pit boss may use a wireless tablet computer indicate to the controller that a service should be provided to the player.

A sensor (e.g., a video camera, a biometric sensor) may identify a player and transmit an indication of the player to the controller.

A player may identify himself (e.g., using a player device). For example, a player may use his cellular telephone to call an "800" number and indicate his player identification number using the numeric keypad on his cellular telephone. In a second example, a player may use a GPS device or other location sensor to determine his precise location (e.g., position #3 at poker table #10) and transmit an indication of his location to the controller.

According to one embodiment, monitoring gaming activities may include identifying a game machine that a player is operating. Examples include receiving an indication from a game machine. For example, a player may insert his player tracking card into a game machine. The game machine may then transmit an indication to the controller that the player is operating the game machine.

In addition an indication may be received from a player. For example, a player may use a player device to indicate an identification number corresponding to a game machine that he is operating. This identification number may be printed on the side of the game machine or otherwise displayed by the game machine.

Further, a record in a database may be identified. For example, the controller may store a database that includes information about a player's gaming activities. To monitor gaming activities by the player, the controller may identify a record in this database corresponding to the player, a game machine, or a session. A benefit may then be provided to a player based on information in the database.

Further, an indication from a casino employee may be received. For example, casino employee may use an electronic device (e.g., a wireless PDA) to indicate the identification number of a game machine that is being operated by a player.

It is also possible that a player may not operate a game machine. For example, a player may play a table game such as poker, craps, or blackjack, or place bets with a sports book or racetrack cashier.

According to one embodiment, monitoring gaming activities may include receiving an indication of gaming activities. For example, a game machine, player device, sensor, or other electronic device may transmit an indication of a player's gaming activities to the controller.

According to one embodiment, the controller may track a player's gaming activities. Examples of information about gaming activities that may be tracked by the controller include an amount of play, a rate of play, a credit balance, comp points earned, events at a game machine that is operated by a player, statistics relating to usage of a game machine by a player.

According to one embodiment, the controller may track factors relating to an amount of play by a player. Examples include a duration of play (e.g., how many minutes a player has operated a game machine), how many games a player has played, how many comp points a player has earned, how long a player uses a feature on the game machine (e.g., how long a player operates a game machine in 3D Graphics Mode), how long a condition has been true (e.g., How long has the player maintained a rate of play of more than 20 games per minute? For how many games has the player's credit balance been above 60 coins?).

Note that an amount of play may be measured in a variety of different units, including time (e.g., seconds, minutes, hours), occurrences (e.g., number of spins, number of games), currency (e.g., number of coins, dollar value, comp points).

According to one embodiment, the controller may track factors relating to player's rate of play. Examples include amount of currency per minute (e.g., coins per minute, dollars per minute), average amount of currency per minute (e.g., on a game machine that he is currently operating, on all game machines that he has played since acquiring a player device), average amount of currency per spin, average number of games per minute, whether a player currently operates a game machine (i.e., is his rate of play greater than zero?).

According to one embodiment, a rate of play may be measured as an amount of play per unit. For example, the controller may track an average amount of currency bet per spin (e.g., 2.3 coins/spin) or an average amount of currency bet per minute (e.g., 18.7 coins/minute). Examples of units for a rate of play include per session, per game (e.g., a spin on a slot machine, a hand of video poker), per minute (or other unit of time—seconds, hours, days, etc.), per event (e.g., per spin, per usage of a feature, per card selection in video poker, per coin bet).

According to one embodiment, the controller may track factors relating to a player's credit balance. Examples include current credit balance on a game machine, average credit balance (e.g., on a game machine that he is currently operating, on all game machines that he has played since acquiring a player device).

According to one embodiment, the controller may track a number of comp points earned by a player. Comp points may be provided to a player for a variety of different reasons, as are known to those skilled in the art.

According to one embodiment, the controller may track events at a game machine that is operated by a player. Examples of events at a game machine include outcomes that are generated by the game machine, intra-game events (e.g., a player is dealt a card in video poker, a player discards a card in video poker, a player gains access to a bonus round on a slot machine), payouts that are provided by the game machine (e.g., 10 coin payout, a $100 jackpot), money is inserted into the game machine by a player (e.g., using a bill acceptor or a coin slot), money is removed from the game machine by a player (e.g., a player presses the 'cash out' button), a bonus is provided to a player (e.g., a player may earn a 10 coin bonus for inserting a $20 bill into a game machine), a player identifies himself (e.g., a player may insert a player tracking card into the game machine), a feature is activated or deactivated, a player operates an input device on the game machine (e.g., a player presses the 'spin' button on a slot machine, a player uses a touch screen to select a card on a video poker machine), information may be output to a player using an output device (e.g., an message may be displayed to a player on a video screen alerting him that he only has 10 coins left), indications from sensors (e.g., a game machine may have a weight sensor that determines when a player is standing in front of the game machine).

In addition to events themselves, the controller may track information about events, including what event occurred, when the event occurred (e.g., what date, what time of day, ordering of events), how often an event occurred (e.g., 14 times, an average of 32.6 times per hour), how much money was added/removed/involved in the event (e.g., How much money did a player insert into a game machine? How large was a payout provided to a player?), results of the event (e.g., What was a player's credit balance after he won a jackpot? What is the state of a program on a game machine after the game machine's software is upgraded?), what caused an event to occur (e.g., why did a player win a jackpot of 100 coins?), other information describing the event (e.g., what authentication code was provided, what activation code was provided).

Alternatively, or in addition, the controller may track statistics relating to usage of the game machine by a player. Examples of statistics include totals, averages, percentages and ratios, revenues ("win"), theoretical win, total prizes won, play patterns (events, times, order, speed of play, strategies used by players).

Examples of totals include a total amount of time (e.g., how many hours a game machine is operated, how many minutes a feature is used), a total number of occurrences of an event (e.g., a total number of offers accepted by players, a total number of times that a feature is activated), a total value of a plurality of events (e.g., a total amount of money cashed out of a game machine, a total amount of payouts provided).

Examples of averages include average credit balance, average coin-in per spin, an average number of occurrences of an event (e.g., an average number of spins per minute), an average value of a plurality of events (e.g., an average credit balance, an average price of hotel rooms sold to players through a game machine).

Averages may be calculated on a 'per unit' basis. For example, the controller may calculate an average coin-in per spin (e.g., 2.3 coins per spin) or an average coin-in per session (e.g., 165.2 coins per session). Examples of units for averages include per session, per play (e.g., a spin on a slot machine, a hand of video poker), per minute (or other unit of time—seconds, hours, days, etc.), per event (e.g., per usage of a feature, per card selection in video poker).

Examples percentages and ratios include a percentage of time (e.g., what percentage of time a game machine spends waiting for a input from a player), a percentage of events (e.g., what percentage of offers presented to a player are accepted), a percentage of games (e.g., what percentage of games are played with a particular feature enabled), a percentage of sessions (e.g., what percentage of sessions are longer than 3 hours).

According to one embodiment, a player may operate multiple game machines. Examples include a player operating two game machines simultaneously, or at different times. For example, a player may operate a first game machine (e.g., a slot machine) and then switch over to operating a second game machine (e.g., a video poker machine). According to one embodiment a service may be provided to a player uninterrupted if the player switches game machines.

Figure 10:
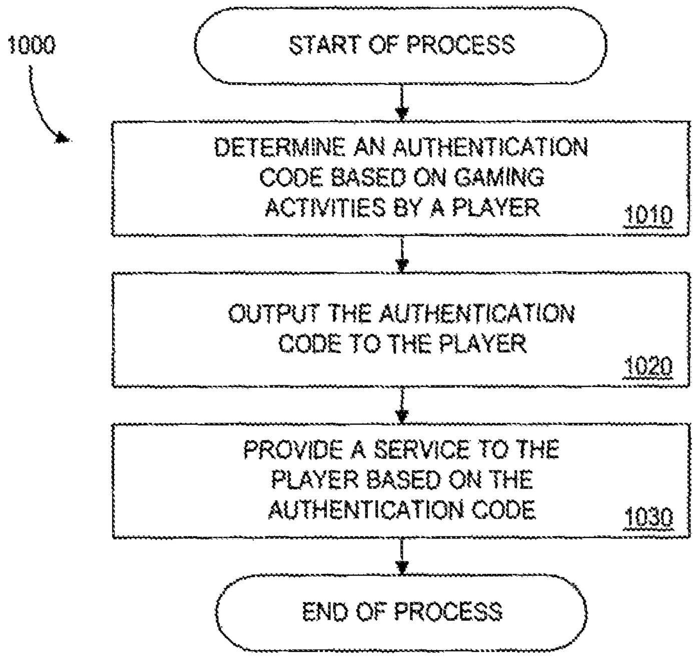
FIG. 10 shows a flowchart corresponding to a process according to an embodiment of the invention.

Referring to FIG. 10, a process 1000 according to an embodiment is illustrated.

An authentication code is determined (step 1010) based on gaming activities of a player. The authentication code is output (step 1020) to the player, and a service is provided to the player (step 1030) based on the authentication code.

The authentication code may serve as "proof" of the player's gaming activities at the game machine. For example, a game machine that a player is operating may display a numeric code to the player. When the player uses his cellular telephone to report his gaming activities, he may provide this numeric code by typing it in using the keypad on his cellular telephone. If the numeric code is correct (i.e., it corresponds to information that the player provides about his gaming activities), then a service may be provided to the player as described herein. If the numeric code is not correct (i.e., it does not correspond to information that the player provides about his gaming activities), then a service may be denied to the player, since presumably the player has lied or otherwise misstated his gaming activities.

According to one embodiment, an authentication code may be an alphanumeric code, sequence of digits, digital certificate, hash value or other information suitable for providing an indication of gaming activities by a player.

An authentication code may be based on or otherwise correspond to gaming activities by a player. For example, the authentication code "471305" may be output by a game machine if a player has played 101 games in the last 15 minutes, whereas the authentication code "945252" may be output if a player has played 124 games in the last 15 minutes. According to one embodiment, an authentication code may include information about a player's gaming activities, a player's identity, or the process of generating the authentication code.

An authentication code may be established so that it is not easily forgeable or guessable. For example, if it were easy to forge/guess an authentication code and thereby pretend to have participated in one or more gaming activities, then players may no longer be motivated by the invention to perform said gaming activities. According to one embodiment, an authentication code may be encoded or generated using a cryptographic protocol or hash function.

Authentication codes may be particularly appropriate for embodiments of the invention such as where a player indicates his own gaming activities. Note that an authentication code may help to prevent a player form lying or otherwise misstating his gaming activities (e.g., in order to obtain a benefit to which he is not entitled).

Such codes are also useful where a game machine is not able to communicate with other devices. In such an embodiment, outputting an authentication code to a party (e.g., a player) may act as the communication link between the game machine and the controller.

Such codes are also useful where a player device is not able to communicate with other devices, as described below.

A game machine may output an authentication code to various different parties, including a player or casino employee. For example, a player may be responsible for reporting his own gaming activities. In order to insure that the player does not lie or accidentally misstate his gaming activities (e.g., to receive a service that he is not entitled to), the player may be required to obtain an authentication code from a game machine and provide this authentication code when reporting his gaming activities. In another example, a casino employee may use an electronic device to indicate information about a player's gaming activities. A game machine may output an authentication code to the casino employee, and the casino employee may indicate this authentication code to the controller. For example, a game machine may display an authentication code on its video screen, and casino employee may view this authentication code use an electronic device (e.g., a cellular telephone) to indicate it to the controller.

An authentication code may be output in a variety of ways, including using an output device (e.g., a display), on a substrate (e.g., a piece of paper, a magnetic disk, an optical disk), transmitting it to a player device (e.g., a PDA, a laptop computer), transmitting it to an electronic device, transmitting it over a network.

For example, a game machine may use an output device (e.g., a printer, a disk drive, a compact disc (CD) burner) to write an indication of an authentication code onto a substrate. For example, a game machine may use a dot matrix printer to print an authentication code on a piece of cashless gaming receipt. In a second example, a game machine may use a thermal printer to print a bar code (i.e., an indication of an authentication code) on a piece of paper. In a third example, a game machine may use a disk drive to store an authentication code on a floppy disk. Note that additional information besides an authentication code may also be written on the substrate (e.g., information about a player's gaming activities, a player identifier, a game machine identifier, a date and time).

As another example, a game machine may transmit an authentication code to a PDA using a infra-red communications link. According to one embodiment, the player device may verify the authentication code and provide a service to a player based on the authentication code.

As another example, a game machine may transmit an authentication code to a wireless PDA operated by a casino employee.

As another example, a game machine may use a communication network to communicate an authentication code to the controller.

As described above, various services may be determined for a player, based on various factors such as the player's gaming activities. According to one embodiment, the controller may determine whether to provide a service to a player. This determination may be based on game data.

For example, a player may receive free telephone service if his rate of play is greater than 7 spins per minute. If the player's rate of play is less than 7 spins per minute, then the player may not receive free telephone service.

As another example, player may receive free movies on a television set for as long as his player tracking card is in a game machine.

As another example, a player device may display a video clip (e.g., a sports highlight) to a player each time the player obtains a winning outcome.

According to one embodiment, the controller may determine what service to provide to a player. This determination may be based on game data. For example, a player may receive free local telephone service if his credit balance is greater than 30 coins. If the player's credit balance is greater than 100 coins, then the player may receive free telephone service to call anywhere in the continental United States (i.e., local or long distance). If the player's credit balance is greater than 200 coins, then the player may receive free telephone service to call anywhere in the world.

As another example, a player may receive a live audio feed of a heavyweight boxing match if his rate of play is greater than 15 coins per minute. If the player's rate of play is greater than 20 coins per minute, the player may also receive a live video feed of the heavyweight boxing match.

Alternatively, a service to be provided to a player may be determined by another party (e.g., a player may select his own service, or there may only be one type of service provided).

According to one embodiment, the controller may determine an amount of a service to provide to a player. An amount of a service may be measured in a variety of different units, including units of time (e.g., minutes), information (e.g., Megabytes), currency (e.g., dollars), or an alternate currency (e.g., points). This determination may be based on game data. For example, a player may receive 1 minute of free long distance telephone service for each minute that he operates a game machine.

As another example, a player may receive 100 kb of downloaded music (e.g., in MP3 format) for each coin that he bets at a game machine.

As another example, a player may receive $0.05 worth of pay-per-view entertainment for every minute that he operates a game machine at a rate of play of at least 3 coins per minute.

As another example, a player may receive 1 minute of free long distance telephone service for each coin that is dispensed to him as part of a jackpot.

According to one embodiment, the controller may determine whether to provide a service, what service to provide, or an amount of a service to provide by evaluating a condition. Examples include whether to provide a service, what service to provide, an amount of a service.

According to one embodiment, a service may be provided to a player so long as a condition is true. For example, a player may receive free long distance telephone service as long as the total number of minutes of telephone service that he uses are less than the total number of minutes that he operates game machine at a rate of at least 16 coins per minute. In a second example, a player may earn phone minutes at a rate of 0.1 minutes per coin bet on a slot machine, or at a rate of 0.2 minutes per coin bet on a video poker machine.

According to one embodiment, a condition may be based on game data (e.g., a player's rate of play, a theoretical win amount for a player). Different types of game data are described herein. According to one embodiment, a condition may also be based on other information. A wide variety of other information is possible, but some examples include an amount of a service provided to a player (e.g., a how many minutes has a player spent on a long distance phone call), information about a service provided (e.g., a cost of a service), information about a player (e.g., is a player staying at the casino hotel, does a player have an MCI calling card), a payment provided by a player, information about other players.

For example, a player may continue to receive a service even after he stops gambling by paying for this service. For example, a player may provide a payment identifier (e.g., a credit card number) when he obtains a player device (e.g., a cordless telephone). Using the cordless telephone, a player may receive free long distance telephone service while he operates a gaming machine. When the player stops operating the game machine, the costs of any additional long distance telephone calls that he makes may be charged to his credit card.

As another example, whichever player in a group maintains the highest rate of play may receive an additional discount in a shopping service that is provided to all the players.

According to one embodiment, a condition may be based on an authentication code that is generated by a game machine. For example, a service may be provided to a player if the player provides an authentication code representative of his gaming activities.

According to one embodiment, evaluating a condition may include evaluating a Boolean expression. This Boolean expression may reference one or more variables and may include Boolean modifiers and conjunctions (e.g. AND, OR, XOR, NOT, NAND), comparators (e.g., >, <, =, >=, <=, !=), mathematical operations (e.g. +, –, *, /, mean, standard deviation, logarithm, derivative, integral), and constants (e.g. $10, 20 coins, 300 credits, 0.02, 15%, pi, TRUE, yellow, "raining"). Examples of Boolean expressions include:

(credit_balance>=100)

(rate_of_play>=3.5) AND (game_played=VIDEO_POKER)

((duration_of_session–service_minutes_used)>0)

(total_number_of games>service_minutes_used)

Note that according to one embodiment, the controller may compare a variable to at least one threshold value. For example, if a player's rate of play is greater than 3.5 coins per minute, then a player may receive free long distance telephone service.

According to one embodiment, the controller may store a condition database. This database may be used to track conditions that may occur and determine what service(s) to provide if a condition is true. An example of a condition database is shown in FIG. 6. Note that conditions may be stored in the condition database may be stored in a variety of different formats, including an indication of a Boolean expression (e.g., "(RATE_OF_PLAY>=15 COINS/MINUTE)"). Also note that an indication of a whether a condition is true may be stored in the condition database, as shown in FIG. 6.

According to one embodiment, the controller may store information about a service to be provided (e.g., an amount of a service to be provided to a player). For example, a player may accumulate a balance of a service (e.g., a total number of minutes, a total number of Megabytes) that may be stored in a player account. Credits may be made to this balance of a service based on the player's gambling activities (e.g., 1 minute of service may be credited to a player's account for each minute he spends operating a game machine). Similarly, the balance of the service may be debited based on the player's usage of the service.

Other embodiments include a balance of a service may be taxed to discourage players from accumulating large balances and not consuming the service. For example, 1 minute may be deducted from a player's balance of a service for every 10 minutes that the player spends not using the service.

Alternatively or additionally, a player may receive a benefit based on a balance of a service that he maintains in a player account. For example, a player may get a bonus of 10 Mb of a service if he accumulates a total of 500 Mb of a service. The player device database shown in FIG. 4 shows one example of how the controller may store a balance of a service.

As described above, various services may be provided to a player. Examples of services that may be provided to a player include communications service (e.g., telephone service, television service, Internet service), telephone service (e.g., local telephone service, long distance telephone service), television service (e.g., a movie, a television show, video phone service, pay per view), Internet service (e.g., through a PDA, cell phone, or laptop computer), audio service (e.g., a radio station, a parallel audio channel), download service (e.g., downloading MP3s audio clips, AVI movie files, electronic books), access to an information source (e.g., access to a website, an MP3 library, a list of discounted products or services, sports scores), access to casino information (e.g., locations of friends in the casino, hot game machines, recent jackpots), discount service (e.g., a price club, a shopping bot, tips on good deals), alert service (e.g., beeper service, wake-up service), medical service (e.g., monitoring a player's heart rate, providing medical advice to a player), printing service (e.g., printing a copy of a digital photo or taking a Polaroid picture), personal service (e.g., a psychic hotline, horoscopes, brokerage service, sports picks/touts), instructional services (e.g., videos, an introduction to a bonus round on a game machine), recommendations or hints (e.g., tricks for better game play, stock trading tips, shopping deals), access to a computer server (e.g., internet access, video game tournaments, newsgroups), and foot massager.

According to one embodiment, the controller may provide information to a player using a player device. According to one embodiment, providing telephone service, television service, or download service may include providing information to a player using a player device. Alternatively, or in addition, the controller may transmit information received from a player using a player device. According to one embodiment, providing telephone service or Internet service may include transmitting information from a player using a player device.

A service may include a plurality of services. For example, a player may receive a service of a television show that includes an audio service, a video service, a closed captioning service, and a parallel audio service.

A variety of different types of player devices are possible, including cordless telephones, portable television sets, PDAs, and laptop computers. Which service is provided and what amount of the service is provided may be determined by the controller as described herein According to one embodiment, a service may be provided to a player for free. Alternatively, a player may pay a fee or provide other consideration for a service that he receives using a player device. For example, based on his gaming activity, a player may receive a discount on a service. For example, a player who maintains a rate of play of 10-15 coins per minute may receive a 50% discount on long distance telephone service.

As another example, a service may be provided for free, but a player may pay a fee to rent a player device. According to one embodiment, a player may pay a rental fee based on an amount of time that a device is used, an amount of time that a device is not in use, or a number of times that a device is used.

According to one embodiment, a service may be provided to a player at a variety of different times. Embodiments include a service may be provided to a player during game play (i.e., while the player is operating a game machine). For example, if a player stops operating a game machine, he may be disconnected from a service.

As another example, a service may be provided to a player after game play. For example, a player may operate a game machine for a few hours and then retire to his hotel room to watch a premium movie channel (i.e., a service) that is provided to him based on his game play.

As another example, a service may be provided to a player before game play. For example, a player may receive a free haircut at a barber shop and then go to a casino floor to play games and earn back the cost of his haircut.

As another example, a player may be permitted to briefly interrupt game play while still receiving a service. For example, a player device may be a mobile, wireless device (e.g., a cordless telephone. A player who operates the player device may be able to stop gaming momentarily and move from a first game machine to a second game machine while continuing to operate the player device and receive a service.

As another example, a service may be provided to a player regardless of his current activity. For example, a player may spend an hour playing a slot machine and building up a balance of telephone minutes. Then the player may stop gambling and spend an hour talking on the phone with a friend (i.e., consuming the balance of telephone minutes) while he eats dinner at a casino restaurant.

As described herein, a player device may provide a service to a player. For example, a player device may coordinate with the controller to provide a service to a player. For example, a player may use a cordless phone (a player device) to make telephone calls through a PBX switch included in the controller.

As another example, a player device may obtain a service through a communication server. For example, a player may use a cell phone (a player device) to connect to a cell phone server and make telephone calls.

As another example, a player device may include a memory that stores entertainment content. This entertainment content may be output to a player as a service. For example, a player device may be a combination TV/DVD player that provides a player with a service of a newly released movie.

As another example, a player device may be an electric foot massager. In response to an indication by the controller, the electric foot massager may provide a service of massaging a player's feet.

According to one embodiment, a player device may receive an indication (e.g., from the controller) that a service should be provided to a player. According to one embodiment, a player device may receive an indication (e.g., from the controller) of what amount of a service should be provided to a player.

According to one embodiment, a player may request a service using a player device. For example, a player may use a numeric keypad on a telephone to dial a toll-free calling card number (e.g., an "800" number) and obtain free long distance telephone service through the telephone.

According to one embodiment, a player device may access a communication network to provide a service to a player. For example, a player device may provide telephone service to a player by accessing a telephone network.

As another example, a player device may provide Internet service to a player by accessing the Internet.

As another example, a first player device (e.g., a first walkie-talkie) may communicate with a second player device (e.g., a second walkie-talkie) using a radio communications channel.

As another example, a player device may connect to a communication network using a communication server.

A player device may be mobile or wireless. According to one embodiment, a player may be free to move about a casino while earning a service or consuming a service. For example, a player may move from a first slot machine to a second slot machine while making a free long distance telephone call to a friend.

As described herein, the controller may identify a player device that may be used to provide a service to a player. For example, the controller may determine a player device that is currently in a player's possession. The controller may access a database, such as the player device database shown in FIG. 4. Information in this database may indicate a player device that corresponds to a player. For example, the player device database in FIG. 4 shows that DEVICE-1-24579282 is currently in the possession of PLAYER-1-02834555.

As another example, the controller may receive an indication that a player is using a particular player device. For example, a player may identify himself when obtaining a player device.

As another example, a player may use a player device to identify himself to the controller, thereby establishing that he is operating the player device. For example, a player may use a cellular telephone to indicate his player identification number, calling card number, or player account number to the controller, thereby identifying himself and establishing that he is operating the cellular telephone. In another example, a player may use a magnetic stripe reader on a player device to indicate his player tracking card number.

As another example, a player may provide an activation code using a player device, thereby indicating to the controller that service should be provided using the player device.

According to one embodiment, the controller may indicate to a player device that a service should be provided. This indication may be transmitted over a communication network. For example, the controller may transmit an activation code to a player device. In response to receiving this activation code, the player device may provide a service to a player.

The controller may indicate to a player device what amount of a service that a player device should provide to a player. For example, the controller may indicate to a player device that 10 minutes of telephone service should be provided to a player. In a second example, a player device may continue providing a service to a player until the controller transmits a deactivation code to the player device. In response to receiving this deactivation code, the player device may cease providing a service to the player.

Alternatively, or in addition, the controller may communicate with a communication server to provide a service to a player using a player device.

According to one embodiment, the controller may provide a service to a player device. For example, the controller may connect a player device to a communication network. For example, the controller may include a PBX switch and use this PBX switch to connect a player device to a telephone network. Using the telephone network, the player device may provide free long distance telephone service to a player.

As another example, the controller may act as a web proxy to connect a player device to the Internet.

As another example, the controller may include a video-on-demand server. The controller may use this video-on-demand server to transmit a movie to a player device (e.g., a portable TV set).

As another example, the controller may store a database of entertainment content (e.g., MP3 clips). The controller may allow a player device to access this database and download entertainment content (a service).

According to one embodiment, the controller may enable a player device on a first communication network (e.g., a short-range radio channel inside a casino) to connect to a second communication network (e.g., a public-switched telephone network, or PSTN).

According to one embodiment, the controller may track how much service is provided to a player. For example, the controller may track how many minutes of telephone service a player uses. This information may be used to determine how much additional service to provide to a player (e.g., how many additional minutes of telephone service).

According to one embodiment, the controller may store a player device database. One embodiment of a player device database is shown in FIG. 4.

A player device database may be used to track player devices that are provided to players and services that are provided to players with these player devices. For example, the player device database shown in FIG. 4 stores an indication "MINUTES OF SERVICE EARNED" and an indication "MINUTES OF SERVICE USED" for each player device. According to one embodiment, a player device may provide service to a player as long as the "MINUTES OF SERVICE EARNED" value is greater than the "MINUTES OF SERVICE USED" value.

According to one embodiment, the controller may provide a service to a player device. For example, a communication server may connect a player device to a communication network.

As another example, a communication server may be a PBX switch that connects a player device (e.g., a telephone) to a telephone network. Using the telephone network, the player device may provide free long distance telephone service to a player.

A communication server may act as a web proxy to connect a player device to the Internet.

As another example, a communication server may be a video-on-demand server that may transmit a movie to a player device (e.g., a portable TV set).

As another example, a communication server may store a database of entertainment content (e.g., MP3 clips). The communication server may allow a player device to access this database and download entertainment content (a service).

According to one embodiment, a communication server may provide a service to a player device based on an activation code.

According to one embodiment, a communication server may indicate to the controller that service is being provided to a player device, or how much service is provided to a player device. According to one embodiment, a portion of a player device database (such as the one shown in FIG. 4) may be stored by a communication server.

According to one embodiment, a service may be provided to a player based on an activation code. For example, a player device may receive an indication of an activation code and provide a service to a player based on this activation code. As another example, a communication server may receive an indication of an activation code and provide a service to a player device based on this activation code. As another example, the controller may receive an indication of an activation code and provide a service to a player based on this activation code.

According to one embodiment, an activation code may be an alphanumeric code, sequence of digits, digital certificate, bar code, or other information suitable for providing an indication that a service should be provided to a player using a player device. For example, an activation code may be a password to a website, a calling card number and PIN, or a gift certificate code for obtaining a free movie viewing.

According to one embodiment, an activation code may be an authentication code, such as those described herein. For example, a player may receive an indication of an authentication code from a game machine and then use this authentication code to obtain a service from a player device, controller, or communication server. Since the player uses the authentication code to obtain a service, the authentication code also serves as an activation code.

Alternatively, an activation code may not be an authentication code. For example, a controller may generate an activation code as a way of indicating to a player device that a service should be provided to a player. In a more detailed example:

A game machine may use a communication network to communicate information to the controller about a player's gaming activities. Based on this information, the controller may determine that a player should receive a service (e.g., free long distance telephone service). However, the controller may not be able to or may prefer not to communicate directly with a player device that is being operated by the player or a communication server (e.g., a PBX telephone switch) that may provide the service to the player. In order to activate the player device to provide the service to the player, the controller may cause the game machine being operated by the player to output an activation code to the player. This activation code may not include any indication of a player's gaming activities and therefore may not be an authentication code. The player may view the activation code output by the game machine and use this activation code to receive a service from a player device.

A casino employee may monitor game play by a player and determine that the player deserves to receive a service based on his game play. The casino employee may then use an electronic device (e.g., a personal computer) to determine an activation code. The casino employee may then indicate this activation code to the player and the player may use this activation code to obtain a service using a player device. Alternatively, the casino employee may indicate the activation code to a player device that is operated by the player.

An activation code may be generated by a variety of different devices, including the controller and a game machine. For example, the controller may generate an activation code and transmit it to a game machine for display to a player. Alternatively, a game machine may generate an activation code and display it to a player.

According to one embodiment, a game machine may output an activation code to a player and then a player may use an input device on a player device to indicate the activation code into the player device. The player device may then provide a service to a player or transmit the activation code to a communication server or the controller.

For example, a game machine may dispense a calling card to a player (e.g., a prepaid calling card). A player may then enter the identification number from this calling card into his cellular telephone using the cellular telephone's numeric keypad.

As another example, a game machine may display an activation code to a player as a series of digits on a video screen. The player may then enter these digits into his laptop computer as a web password in order to receive a web service.

As another example, a game machine may use an audio speaker to output DTMF (dual-tone multiple-frequency) tones to a player. These DTMF tones may correspond to a telephone number, calling card number, or PIN (personal identification number). To receive a service based on the DTMF tones a player may hold the microphone of a telephone (e.g., his cellular telephone) up to the audio speaker on the game machine, thereby allowing the game machine to dial a number on the telephone.

As another example, a game machine may display an activation code as a bar code on a video screen or a printed substrate. A player may then use a bar code scanner on a player device to scan this bar code and obtain a service from the player device.

As described herein, an indication of service may be output to a player using a player device. For example, a player device may output an indication that service is being provided to a player. For example, an LED on a cordless telephone may indicate that a player may use the cordless telephone to make or receive telephone calls. In a second example, a second LED on the cordless telephone may indicate when the telephone is in use.

As another example, a player device may output an indication of how much service may be provided to a player. For example, a recorded voice may inform a player who is talking on a telephone that he only has 5 minutes of service left. In a second example, a countdown timer on a portable television may display how many minutes of television viewing time a player has remaining.

As another example, a player device may output an indication of how much service has been provided to a player. For example, an LCD screen on a PDA may indicate how many minutes a player has spent browsing the World Wide Web.

As another example, a player device may output an indication of a total amount of service to be provided to a player. For example, an LCD screen on a cellular phone may indicate how many dollars worth of airtime a player has earned based on his gaming activities.

According to one embodiment, a player device may indicate to a player how he may obtain a service. For example, a player device may indicate to a player that his current rate of play is only 14.8 coins per minute and that he should increase his rate of play to 15 coins per minute in order to obtain a service.

As another example, a player device may indicate to a player that he only has 5 minutes of talk time remaining on his telephone service. To continue his phone call and obtain more telephone service, the player should insert more coins into his game machine.

As another example, a player device may indicate to a player that he needs to play 20 more games in order to be able to watch the last 20 minutes of a movie.

As another example, a player device may indicate to a player that he has to pay a fee or provide other consideration (e.g., perform a value-added activity) in order to obtain a service. For example, a player device may output an offer to a player, "If you sign up for a new credit card, then you will get free cell phone service for the entire rest of your visit to the casino."

Alternatively, an indication of service or an indication of how a player may obtain service may be output to a player using a game machine or other device. For example, the controller may identify a game machine that a player is operating and direct this game machine to display an on-screen message, "Good work! Your average rate of play is 16.4 coins per minute. As long as you maintain a rate of play of at least 16 coins per minute, you get free telephone calls to anywhere in the continental United States. If you increase your rate of play to at least 20 coins per minute, then you get free telephone calls to anywhere in the US, Europe, or Asia."

Various player devices are also possible, including player devices that are less portable than a cell phone or PDA or not portable at all. Additional examples of player devices include a television set top box, a telephone in a player's hotel room, a player's home telephone, a hotel room mini-bar, a vending machine, an ATM machine, a parking meter, a fax machine, photocopies, printouts, a tanning booth, a whirlpool, a massage device, a video game machine, a product dispenser on the casino floor. In some cases, these player devices are not associated with specific players.

Note that in some cases, these player devices may not be present on the gaming floor of a casino where game machines are traditionally located. For example, a television set-top box may be located in a player's hotel room, while all the game machines in a casino may be located downstairs on the gaming floor of the casino. The invention provides for a number of different ways to provide a benefit to player using a player device that is not present on the gaming floor of a casino. For example, a benefit may be provided after a player has completed his gaming activities. For example, a casino may add credits to a calling card based on a player's gaming activities. The player may then return home and use this calling card from his home telephone to make long distance telephone calls for free.

As another example, a player may engage Auto-Play Mode on a game machine, thereby making it easy for him leave the casino floor while still gaming. For example, a player may put a game machine into Auto-Play Mode and then return to his hotel room in a casino. The hotel room telephone may provide the player with free long distance telephone service so long as the game machine on the casino floor remains in Auto-Play Mode.

As another example, a player may operate a portable game machine (e.g., a handheld gaming device like PDA or Nintendo Gameboy). The player may carry this game machine with him as he moves about a casino or other locale (e.g., Las Vegas), thereby making it possible for a player to receive a benefit from a non-portable player device while at the same time maintaining his game play. For example, a player may receive a free soda from a vending machine based on his game play on a portable gaming device.

According to one embodiment, a player may borrow or rent a player device. In one embodiment, a player who borrows or rents a player device may return the player device. For example, a player may return a player device to a casino desk, a player may drop a player device into a deposit bin next to an exit of a casino, a player may signal for a casino employee to visit a slot machine where he is gambling and retrieve a player device that he is finished using, a player may return a player device to a vending machine (e.g., the same vending machine that the player used to obtain the player device), a player may leave a player device in his hotel room when he checks out of a casino, a player may return a player device to a game machine.

For example, a game machine may include a drop box where players can return player devices or a locking mechanism that locks a player device to a game machine.

According to one embodiment, a player may be asked to return a player device according to various conditions. Examples of conditions include: a player device must be in working order when it is returned, a player device must be returned during a specified time period, a player device must be returned at a specified location, a player device must have been used in a prescribed manner.

According to one embodiment, a player may receive a benefit for returning a player device. For example, a security deposit may be refunded based on a player returning a device. In a second example, a player may receive a ticket for a free luncheon buffet in exchange for using and returning a player device. According to one embodiment, a benefit may only be provided to a player if a condition is true (e.g., the player returned the device on time, the player used the device for at least 80% of the time that he borrowed it).

According to one embodiment, a player who does not return a player device may be charged a penalty fee or be asked to provide other consideration. For example, a player's credit card may be charged for the price of a player device if the player does not return the player device. According to one embodiment, a penalty may be levied to a player if a condition is true (e.g., the player returned a device late, the player used the device for less than 10% of the time that he borrowed it).

According to one embodiment, a player may not be required to return a player device. For example, a player device may belong to a player (e.g., a player may use his PDA as a player device), or be disposable (e.g., a disposable cell phone), or a player device may be provided to a player as a benefit (e.g., player may earn the player device). See Section 9.3 for further details about a player earning a player device as a benefit.

According to one embodiment, a player may use more of a service than he earns. In such an embodiment, a player may pay for any additional service that he consumed. According to one embodiment, a player's payment identifier may be charged the cost of any service that player consumes in excess of what is awarded to him based on his gaming activities.

For example, a player may earn phone minutes at a rate of 1 phone minute for every minute that he spends gaming with a rate of play of at least 16 coins per minute. If the player spends most of his time gaming at a slow rate (e.g., 12 coins per minute), he may not earn very many phone minutes. At the end of his session, he may have spent 32 minutes talking on the phone, but only earned 8 minutes of phone time. The player's credit card may be charged for the 24 minutes of phone time that he consumed in excess of the 8 minutes that was awarded to him based on his gaming activities.

According to one embodiment, a service may be provided to a first player based on the gaming activities of at least one second player. For example, a premium movie channel may be made available to a plurality of players if the plurality of players all maintain a rate of play of at least 2 coins per game. In a second example, free Internet access may be provided to a plurality of players if at least 75% of the players are operating game machines simultaneously.

Embodiments like these may be particularly appealing to groups of players like families, friends, church groups, and social clubs. For example, players in a bingo club may visit a casino and borrow portable televisions while they gamble. The portable televisions may display premium movies to the players in the bingo club, but only as long as the players are betting a total of at least 100 coins per minute.

It is anticipated that players in a group who receive benefits based on each other's gaming activities may encourage each other to gamble more, or gamble more quickly. This behavior may increase revenues for a casino.

According to one embodiment, the controller may determine an amount of a service to provide to a player based on the gaming activities of at least one other player.

According to one embodiment, a service may be provided to a plurality of players. For example, a live feed of a heavyweight boxing match may be broadcast simultaneously to a plurality of players on a team.

According to one embodiment, an alert or message may be displayed to a player describing gaming activities of at least one other player. A message may be output through a player device (e.g., a cellular telephone) or a game machine that a player is operating. For example, a pop-up window on a video poker machine may display a message, "Your friend John Jones is only playing at a rate of 13.9 coins per minute. If he doesn't speed up soon, your long distance telephone service will be terminated."

As another example, an LCD screen on a player device may display a message to a player, "Congratulations! Your team has played a total of 1,248 games so far. Based on this, you get free Internet access."

According to one embodiment, a player may use a player device to communicate with one or more players on his team. For example, a plurality of players on a team may use cordless telephone to connect to a "party-line" where they can converse with each other and share in the excitement of each other's gambling activities.

According to one embodiment, a player may receive any benefit from a player device. Examples of benefits other than services include products, consideration, alternate currencies (e.g., comp points, casino tokens), coupons (e.g., printed using a printer on a player device), food and drug products (e.g., drinks, candy, cigarettes, pills).

According to one embodiment, a player device may include a reservoir, hopper, or other container that stores one or more products. A product may be dispensed from this reservoir based on a player's gaming activities. For example, a player device may dispense a coupon for 30% off of a designer dress at a shopping mall near a casino. As anther example, a player device may dispense a $1 casino chip to a player for every $100 he bets at a game machine. As anther example, a player device may dispense a gourmet chocolate candy to a player every time the player wins a prize of more than 10 coins.

According to one embodiment, a player may earn the right to keep a player device that he has borrowed, rented, or leased. For example, a player who spends more than $300 gaming at a casino may earn the right to keep a cellular telephone that he was using as a player device.

Keeping a player device may include borrowing/renting or taking ownership of the device. In borrowing or renting the player device for an extended period of time, for example, a player may earn the right to borrow a player device from a casino for an entire week as opposed to just a few hours. In taking ownership of the player device, for example, a player may be allowed to take a player device home with him from a casino and use it for whatever he sees fit.

According to one embodiment, a player device may be given to the player as a comp (complimentary) or gift based on the player's gaming activities. For example, a player may borrow a player device from a casino with the understanding that the player will return the player device when he finishes gaming at the end of the day. However, if the player earns more than 2000 comp points while using the player device, then the player may not be required to return the player device. Instead the player may keep the device and take it home with him.

According to one embodiment, a player may earn the right to keep a player device by accepting an offer. For example, an offer to perform an activity and receive a benefit may be made to the player (e.g., output to the player by the player device). If the player accepts this offer and performs the specified activity, then the player may be permitted to keep the player device as a benefit (e.g., the player may take ownership of the device).

According to one embodiment, an offer to keep a player device may be output to a player using the player device. For example, a cellular telephone that a player has borrowed may display a message to the player on an LCD screen, "If you sign up for 2 years of cellular phone service with Sprint, you can keep this cell phone."

According to one embodiment, a player may accept an offer using a player device. For example, a PDA may output an offer, "You can take this PDA home with you if you purchase a hotel room and stay a the casino tonight." In addition, the PDA may display a multiple-choice list of response for the player to chose from, including yes (with various preferences indicated) or no. The player may then respond to the question by selecting one of the options using a stylus associated with the PDA.

According to one embodiment, one or more reminders may be output to a player indicating his progress towards earning a player device. For example, cordless telephone may display a message to a player, "If you gamble for just 3 more hours, you can take this telephone home with you for free."

Providing a player device to a player may be a particularly effective product trial. For example, a player may borrow or rent a player device that he has never used before (e.g., a new type of cellular telephone). By using the player device to receive a service according to the method of the invention, the player may be introduced to the player device and become interested in purchasing the player device or a similar player device. For example, when using a Samsung cellular telephone that he borrowed from a casino, a player may notice that the voice-dial feature on this cellular telephone is particularly useful and become interested in purchasing a Samsung cellular telephone of his own.

As another example, a player who has never owned a PDA before may find a Palm m500 PDA that he is renting to be particularly useful in browsing the Internet and become interested in purchasing PDAs for the sales representatives at his company.

Examples of parties that may be interested in introducing players to new player devices using the invention include player device manufacturers (e.g., cell phone manufacturers like Nokia and Motorola, PDA manufacturers like Palm and Compaq, consumer electronics manufacturers like Sony or Samsung), player device retailers (e.g., Circuit City, Best Buy, Amazon.com), and service providers (e.g., cellular telephone and wireless service providers like Sprint, AT&T, and Verizon Wireless, Internet service providers like America Online, Earthlink, and Boingo).

According to one embodiment, a party (e.g., a player device manufacturer, retailer, or service provider) may subsidize a player's use of a player device. For example, a cell phone manufacturer may pay for part of the cost of cell phone calls made by a player using a new cell phone from the manufacturer, in the hope that the player will become interested in purchasing the cell phone. As another example, a tablet computer manufacturer may provide a set of tablet computers to a casino for free as a way of marketing their product to players. For example, after using a tablet computer at a casino, a player may return home and tell his friends about how useful the tablet computer was.

Although the present invention has been described with respect to a preferred embodiment thereof, those skilled in the art will note that various substitutions may be made to those embodiments described herein without departing from the spirit and scope of the present invention.

The invention is claimed as follows:

1. A method of operating a system, said method comprising:

(a) for each of at least one play of a game:

(i) causing at least one processor to determine a game outcome, and (ii) causing a display of the determined game outcome; and (b) providing a non-monetary award in association with said at least one play of the game, said non-monetary award being usable to cause a free download of data to a portable handheld electronic device through a data network, said portable handheld electronic device being separate from the system and including a processor, a memory device, a display device, and an input device including a touch screen.

2. The method of claim 1, wherein the downloadable data includes purchasable data.

3. The method of claim 1, wherein the data network includes an internet.

4. The method of claim 1, wherein the non-monetary award is a non-monetary code usable by the portable handheld electronic device to obtain the free download of the downloadable data.

5. The method of claim 4, which includes wirelessly sending the non-monetary code to the portable handheld electronic device.

6. The method of claim 1, wherein the downloadable data is one of audio content and video content.

7. The method of claim 1, which includes determining the non-monetary award based on at least one of: (a) a quantity of plays of the game; (b) a rate of play; and (c) an amount of time spent playing the game.

8. The method of claim 1, which includes determining the non-monetary award based on whether a designated condition is satisfied.

9. A system comprising:

at least one display device at least one input device;

at least one processor; and at least one memory device which stores a plurality of instructions which, when executed by the at least one processor, cause the at least one processor to operate with the at least one display device and at least one input device to:

(a) for each of at least one play of a game:

(i) determine a game outcome, and (ii) cause a display of the determined game outcome; and (b) provide a non-monetary award in association with said at least one play of the game, said non-monetary award being usable to cause a free download of data to a portable handheld electronic device through a data network, said portable handheld electronic device being separate from the system and including a processor, a memory device, a display device, and an input device including a touch screen.

10. The system of claim 9, wherein the downloadable data includes purchasable data.

11. The system of claim 9, wherein the data network includes an internet.

12. The system of claim 9, wherein the non-monetary award is a non-monetary code usable by the portable handheld electronic device to obtain the free download of the downloadable data.

13. The system of claim 9, wherein the downloadable data is one of audio content and video content.

14. The system of claim 9, wherein the non-monetary award is determined based on at least one of: (a) a quantity of plays of the game; (b) a rate of play; and (c) an amount of time spent playing the game.

15. The system of claim 9, wherein the non-monetary award is determined based on whether a designated condition is satisfied.

16. A method of operating a system including at least one display device, at least one input device including a touch screen, at least one processor, and at least one memory device, said method comprising:

causing the at least one processor to operate with the at least one display device and the at least one input device to:

for each of at least one play of a game:

(i) determine a game outcome, and (ii) display the determined game outcome; and causing the at least one processor to operate with the at least one display device to:

display an indication of a non-monetary award in association with said at least one play of the game, said non-monetary award being usable to cause a free download of data through a data network to the at least one memory device, said downloadable data being distinct from any data associated with said play of the game.

17. The method of claim 16, wherein the downloadable data includes purchasable data.

18. The method of claim 16, wherein the data network includes an internet.

19. The method of claim 16, wherein the non-monetary award is a non-monetary code usable to obtain the free download of the downloadable data.

20. The method of claim 16, wherein the downloadable data is one of audio content and video content.

21. The method of claim 16, which includes causing the at least one processor determine the non-monetary award based on at least one of: (a) a quantity of plays of the game; (b) a rate of play; and (c) an amount of time spent playing the game.

22. The method of claim 16, which includes causing the at least one processor determine the non-monetary award based on whether a designated condition is satisfied.

23. A system comprising:

at least one display device at least one input device including a touch screen;

at least one processor; and at least one memory device which stores a plurality of instructions which, when executed by the at least one processor, cause the at least one processor to operate with the at least one display device and the at least one input device to:

(a) for each of at least one play of a game:

(i) determine a game outcome, and (ii) display the determined game outcome; and (b) display an indication of a non-monetary award in association with said at least one play of the game, said non-monetary award being usable to cause a free download of data through a data network to the at least one memory device, said data being distinct from said play of the game.

24. The system of claim 23, wherein the downloadable data includes purchasable data.

25. The system of claim 23, wherein the data network includes an internet.

26. The system of claim 23, wherein the non-monetary award is a non-monetary code usable to obtain the free download of the data.

27. The system of claim 23, wherein the downloadable data is one of audio content and video content.

28. The system of claim 23, wherein when executed by the at least one processor, the plurality of instructions cause the at least one processor to cause a determination of the non-monetary award based on at least one of: (a) a quantity of plays of the game; (b) a rate of play; and (c) an amount of time spent playing the game.

29. The system of claim 23, wherein when executed by the at least one processor, the plurality of instructions cause the at least one processor to cause a determination of the non-monetary award based on whether a designated condition is satisfied.

* * * * *

UNITED STATES PATENT AND TRADEMARK OFFICE
CERTIFICATE OF CORRECTION

PATENT NO. : 9,159,186 B2
APPLICATION NO. : 14/095249
DATED : October 13, 2015
INVENTOR(S) : Walker et al.

It is certified that error appears in the above-identified patent and that said Letters Patent is hereby corrected as shown below:

IN THE CLAIMS

Claim 9, Column 29, Line 38, between “and” and the second instance of “at” insert --the--.
Claim 16, Column 30, Line 18, between “said” and “play” insert --at least one--.
Claim 21, Column 30, Line 29, between “processor” and “determine” insert --to--.
Claim 22, Column 30, Line 33, between “processor” and “determine” insert --to--.
Claim 23, Column 30, Line 51, between the second instance of “said” and “play” insert --at least one--.

Signed and Sealed this
Fourteenth Day of June, 2016

Michelle K. Lee
*Director of the United States Patent and Trademark Office*